US012625782B2

(12) United States Patent
Brar et al.

(10) Patent No.: US 12,625,782 B2
(45) Date of Patent: May 12, 2026

(54) TECHNIQUES FOR REPLICATING STATE INFORMATION FOR HIGH AVAILABILITY

(71) Applicant: Oracle International Corporation, Redwood Shores, CA (US)

(72) Inventors: Jagwinder Singh Brar, Bellevue, WA (US); Eugene Nalimov, Redwood Shores, CA (US); Steven Chervets, Seattle, WA (US); Abhay Patil, Seattle, WA (US); Michal Aleksander Karczmarek, Newton, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 9 days.

(21) Appl. No.: 18/951,469

(22) Filed: Nov. 18, 2024

(65) Prior Publication Data

US 2025/0156284 A1 May 15, 2025

Related U.S. Application Data

(63) Continuation of application No. 17/644,287, filed on Dec. 14, 2021, now Pat. No. 12,147,318.

(Continued)

(51) Int. Cl.
| | |
|---|---|
| *G06F 11/20* | (2006.01) |
| *G06F 9/455* | (2018.01) |
| *G06F 11/07* | (2006.01) |

(52) U.S. Cl.
CPC ...... *G06F 11/2025* (2013.01); *G06F 9/45558* (2013.01); *G06F 11/0712* (2013.01); *G06F 11/2005* (2013.01); *G06F 2009/45595* (2013.01)

(58) Field of Classification Search
CPC ....... G06F 2009/45595; G06F 11/1464; G06F 11/1658; G06F 11/1675; G06F 11/1683; G06F 11/1687; G06F 11/2002; G06F 11/2005; G06F 11/2007; G06F 11/2023; G06F 11/2025; G06F 11/2028;
(Continued)

(56) References Cited

U.S. PATENT DOCUMENTS

| | | | | | |
|---|---|---|---|---|---|
| 9,473,400 | B1 * | 10/2016 | DeVilbiss | ............... | H04L 45/70 |
| 2002/0156921 | A1 * | 10/2002 | Dutta | ...................... | H04L 67/04 |
| | | | | | 709/219 |

(Continued)

OTHER PUBLICATIONS

"5-Tuple" by Rouse, 2014. (Year: 2014).*

*Primary Examiner* — Gabriel Chu
(74) *Attorney, Agent, or Firm* — Kilpatrick Townsend & Stockton LLP

(57) ABSTRACT

A Network Virtualization Device (NVD) executes a set of Virtual Network Interface Cards (VNICs). The set of VNICs includes a first VNIC that forwards packets for a set of one or more packet flows. The NVD stores a first VNIC-related information that includes information identifying a first set of one or more packet flows and associated state information The NVD in response to determining that the state information for the first VNIC is to be synchronized with another NVD, identifies a first backup NVD for the first VNIC, wherein the first backup NVD is a backup for the first VNIC, and communicates to the first backup NVD, a portion of the state information stored by the NVD for the first VNIC.

20 Claims, 22 Drawing Sheets

Related U.S. Application Data

(60) Provisional application No. 63/132,344, filed on Dec. 30, 2020.

(58) Field of Classification Search
CPC ............. H04L 41/0659; H04L 41/0663; H04L 41/0668; H04L 41/062
See application file for complete search history.

(56) References Cited

U.S. PATENT DOCUMENTS

| | | | | |
|---|---|---|---|---|
| 2004/0049774 A1* | 3/2004 | Boyd | .................... | G06F 13/385 |
| | | | | 714/E11.078 |
| 2004/0199808 A1* | 10/2004 | Freimuth | ................. | H04B 1/74 |
| | | | | 714/4.11 |
| 2007/0268820 A1* | 11/2007 | McGee | .................... | H04B 3/46 |
| | | | | 370/390 |
| 2008/0016387 A1* | 1/2008 | Bensinger | ........... | G06F 11/1446 |
| | | | | 714/4.11 |
| 2009/0304002 A1* | 12/2009 | Yu | ........................... | H04L 49/30 |
| | | | | 370/395.3 |
| 2012/0069730 A1* | 3/2012 | Johnsen | .................. | H04L 45/00 |
| | | | | 370/218 |
| 2012/0221526 A1* | 8/2012 | Peng | .................. | H04L 41/0816 |
| | | | | 707/654 |
| 2014/0281701 A1* | 9/2014 | Krishnasamy | ........ | G06F 11/142 |
| | | | | 714/15 |
| 2019/0108106 A1* | 4/2019 | Aggarwal | ............. | G06F 3/0673 |
| 2020/0007383 A1* | 1/2020 | Efraim | .................... | H04L 49/30 |
| 2020/0136853 A1* | 4/2020 | Schlittenbauer | ...... | H04L 12/281 |

\* cited by examiner

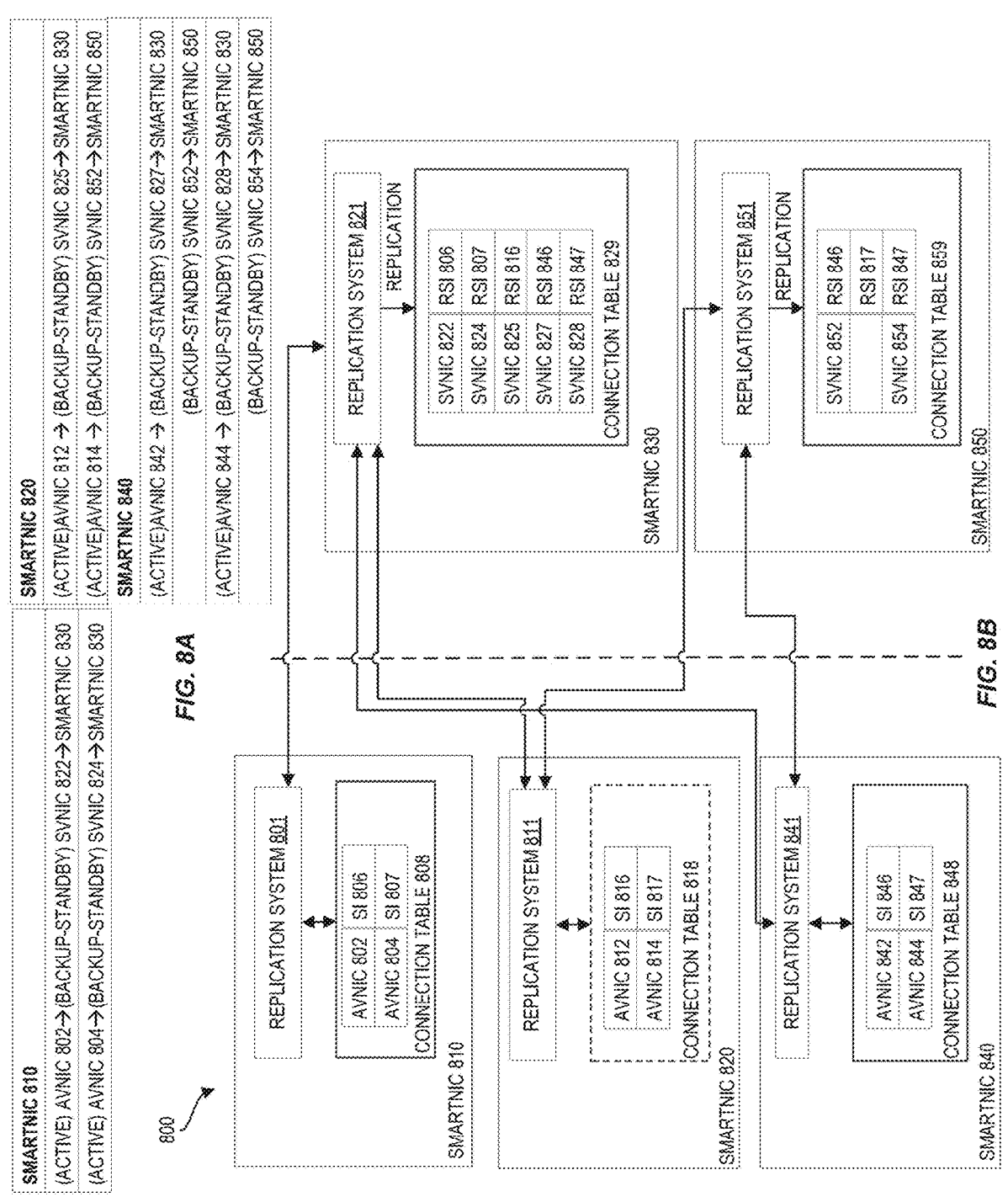

SMARTNIC 810

(ACTIVE) AVNIC 802→(BACKUP-STANDBY) SVNIC 822→SMARTNIC 830

(ACTIVE) AVNIC 804→(BACKUP-STANDBY) SVNIC 824→SMARTNIC 830

SMARTNIC 820

(ACTIVE)AVNIC 812 → (BACKUP-STANDBY) SVNIC 825 → SMARTNIC 830

(ACTIVE)AVNIC 814 → (BACKUP-STANDBY) SVNIC 852 → SMARTNIC 850

SMARTNIC 840

(ACTIVE)AVNIC 842 → (BACKUP-STANDBY) SVNIC 827→SMARTNIC 830

(BACKUP-STANDBY) SVNIC 852 → SMARTNIC 850

(ACTIVE)AVNIC 844 → (BACKUP-STANDBY) SVNIC 828 → SMARTNIC 830

(BACKUP-STANDBY) SVNIC 854→SMARTNIC 850

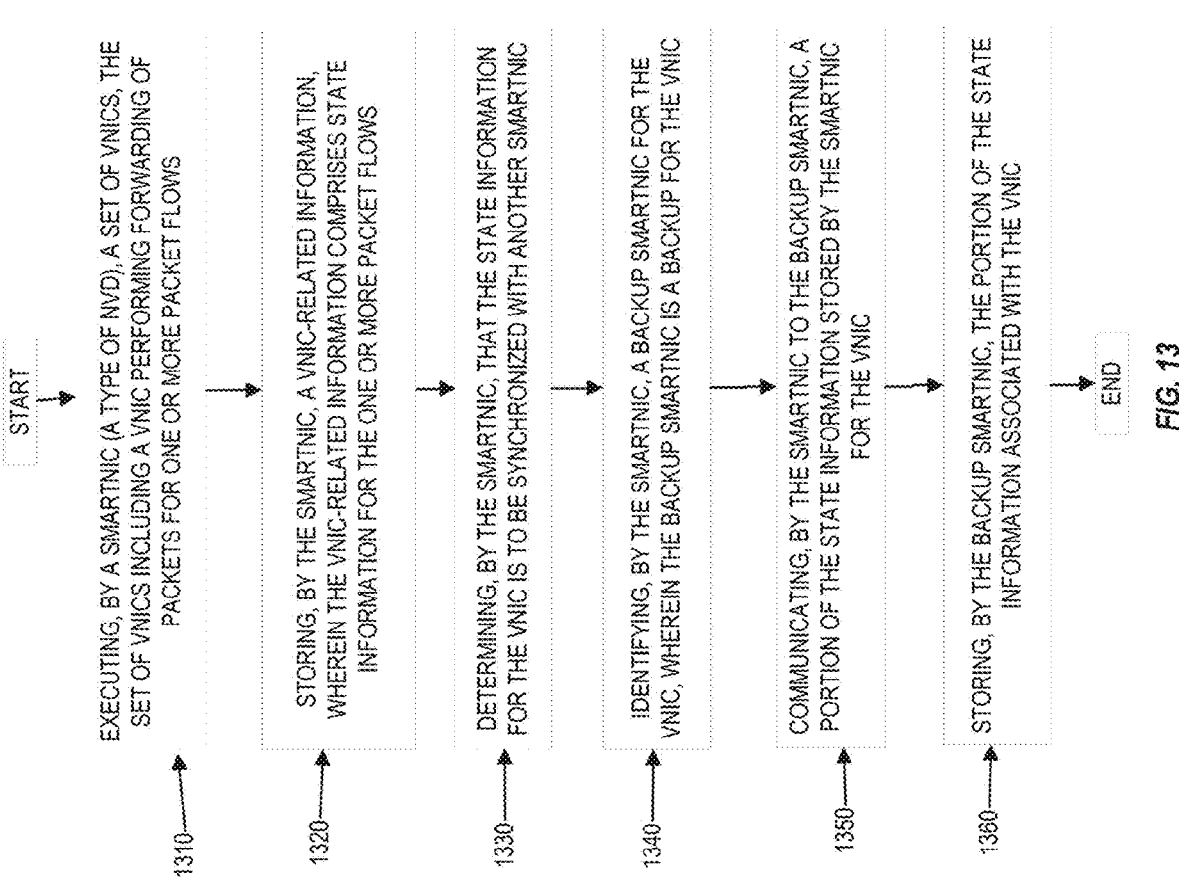

1310 — EXECUTING, BY A SMARTNIC (A TYPE OF NVD), A SET OF VNICS, THE SET OF VNICS INCLUDING A VNIC PERFORMING FORWARDING OF PACKETS FOR ONE OR MORE PACKET FLOWS

1320 — STORING, BY THE SMARTNIC, A VNIC-RELATED INFORMATION, WHEREIN THE VNIC-RELATED INFORMATION COMPRISES STATE INFORMATION FOR THE ONE OR MORE PACKET FLOWS

1330 — DETERMINING, BY THE SMARTNIC, THAT THE STATE INFORMATION FOR THE VNIC IS TO BE SYNCHRONIZED WITH ANOTHER SMARTNIC

1340 — IDENTIFYING, BY THE SMARTNIC, A BACKUP SMARTNIC FOR THE VNIC, WHEREIN THE BACKUP SMARTNIC IS A BACKUP FOR THE VNIC

1350 — COMMUNICATING, BY THE SMARTNIC TO THE BACKUP SMARTNIC, A PORTION OF THE STATE INFORMATION STORED BY THE SMARTNIC FOR THE VNIC

1360 — STORING, BY THE BACKUP SMARTNIC, THE PORTION OF THE STATE INFORMATION ASSOCIATED WITH THE VNIC

START

END

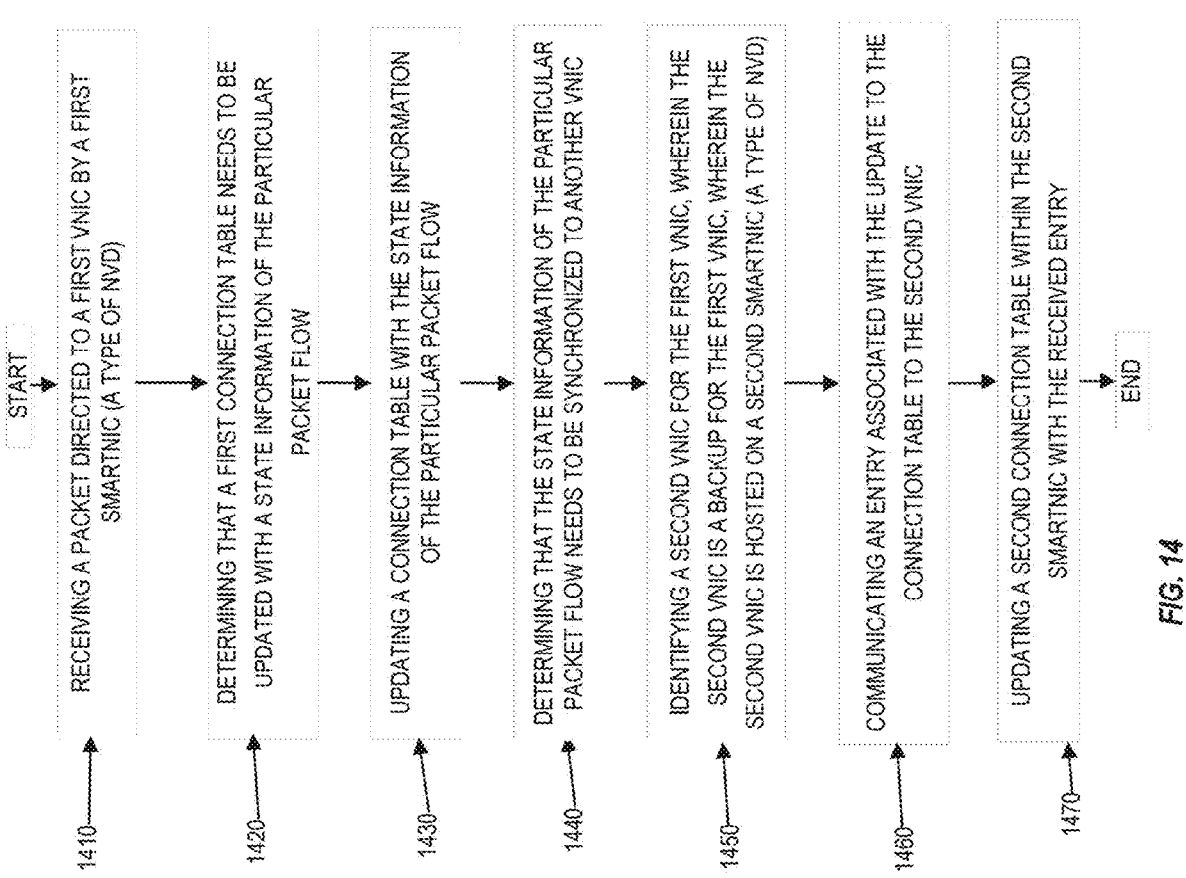

START

1410 — RECEIVING A PACKET DIRECTED TO A FIRST VNIC BY A FIRST SMARTNIC (A TYPE OF NVD)

1420 — DETERMINING THAT A FIRST CONNECTION TABLE NEEDS TO BE UPDATED WITH A STATE INFORMATION OF THE PARTICULAR PACKET FLOW

1430 — UPDATING A CONNECTION TABLE WITH THE STATE INFORMATION OF THE PARTICULAR PACKET FLOW

1440 — DETERMINING THAT THE STATE INFORMATION OF THE PARTICULAR PACKET FLOW NEEDS TO BE SYNCHRONIZED TO ANOTHER VNIC

1450 — IDENTIFYING A SECOND VNIC FOR THE FIRST VNIC, WHEREIN THE SECOND VNIC IS A BACKUP FOR THE FIRST VNIC, WHEREIN THE SECOND VNIC IS HOSTED ON A SECOND SMARTNIC (A TYPE OF NVD)

1460 — COMMUNICATING AN ENTRY ASSOCIATED WITH THE UPDATE TO THE CONNECTION TABLE TO THE SECOND VNIC

1470 — UPDATING A SECOND CONNECTION TABLE WITHIN THE SECOND SMARTNIC WITH THE RECEIVED ENTRY

END

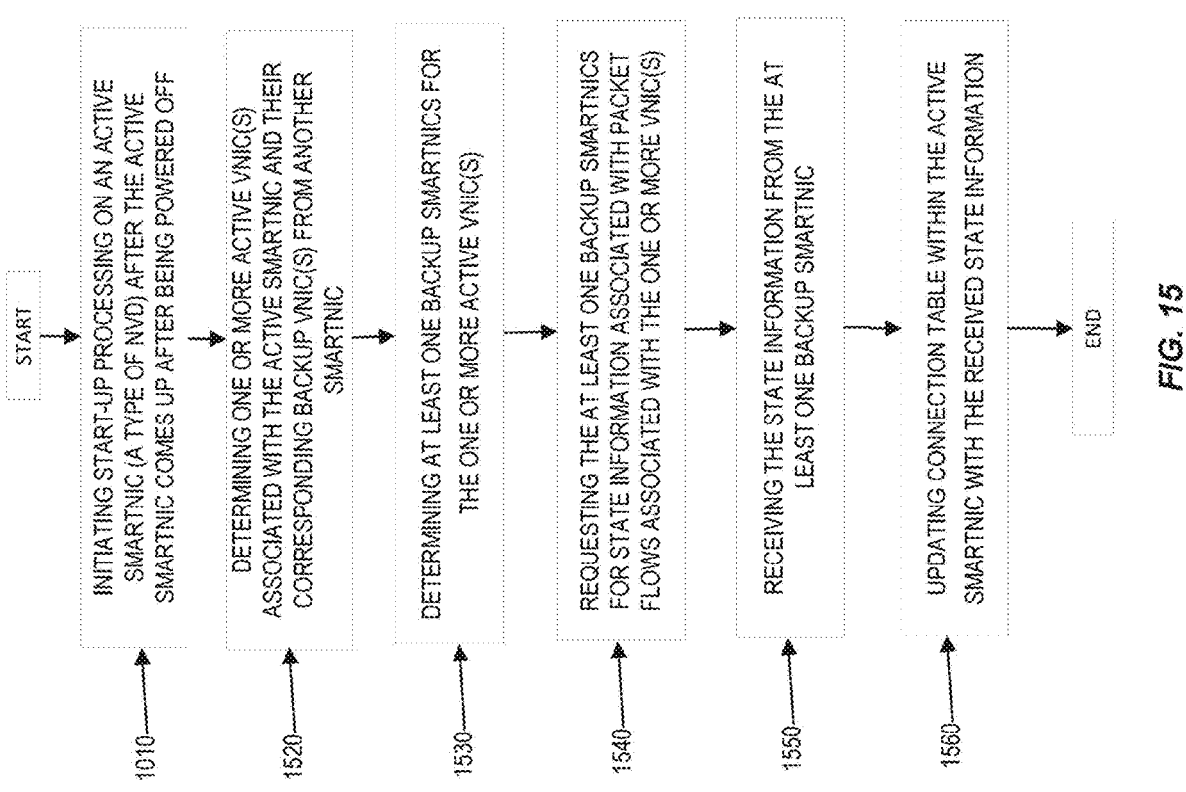

START

1010 → INITIATING START-UP PROCESSING ON AN ACTIVE SMARTNIC (A TYPE OF NVD) AFTER THE ACTIVE SMARTNIC COMES UP AFTER BEING POWERED OFF

1520 → DETERMINING ONE OR MORE ACTIVE VNIC(S) ASSOCIATED WITH THE ACTIVE SMARTNIC AND THEIR CORRESPONDING BACKUP VNIC(S) FROM ANOTHER SMARTNIC

1530 → DETERMINING AT LEAST ONE BACKUP SMARTNICS FOR THE ONE OR MORE ACTIVE VNIC(S)

1540 → REQUESTING THE AT LEAST ONE BACKUP SMARTNICS FOR STATE INFORMATION ASSOCIATED WITH PACKET FLOWS ASSOCIATED WITH THE ONE OR MORE VNIC(S)

1550 → RECEIVING THE STATE INFORMATION FROM THE AT LEAST ONE BACKUP SMARTNIC

1560 → UPDATING CONNECTION TABLE WITHIN THE ACTIVE SMARTNIC WITH THE RECEIVED STATE INFORMATION

END

FIG. 15

START

1710 — DETERMINING THAT A FAILOVER EVENT HAS OCCURRED WITHIN A SMARTNIC (A TYPE OF NVD) OF AN ACTIVE VNIC

1720 — IDENTIFYING BAKCUP VNIC(S) AND THEIR CORRESPONDING SMARTNIC(S) FOR THE ACTIVE VNIC OF THE SMARTNIC

1730 — REDIRECTING NETWORK PACKETS FOR THE VNIC TO THE BACKUP VNIC(S)

1740 — PROCESSING NETWORK PACKETS BY THE BACKUP VNIC(S) AND THEIR ASSOCIATED SMARTNIC(S)

END

1700

1

TECHNIQUES FOR REPLICATING STATE INFORMATION FOR HIGH AVAILABILITY

CROSS-REFERENCES TO RELATED APPLICATIONS

This application is a continuation of application Ser. No. 17/644,287 filed Dec. 14, 2021, which claims the benefit of the filing date of U.S. Provisional Application No. 63/132,344, filed on Dec. 30, 2020, the entire contents of which are incorporated herein by reference for all purposes.

BACKGROUND

The demand for cloud-based services continues to increase rapidly. The term cloud service is generally used to refer to a service that is made available to users or customers on demand (e.g., via a subscription model) using systems and infrastructure (cloud infrastructure) provided by a cloud services provider. Typically, systems that make up the cloud service provider's infrastructure are separate from the customer's own on-premise servers and systems. Customers can thus avail themselves of cloud services provided by the cloud service provider without having to purchase separate hardware and software resources for the services. There are various different types of cloud services including Software-as-a-Service (SaaS), Platform-as-a-Service (PaaS), Infrastructure-as-a-Service (IaaS), and others.

To utilize cloud services, network traffic between customer's on-premise equipment and resources in the cloud is processed and transmitted over one or more specialized Network Virtualization Devices that includes Network Interface Card(s). A Network Virtualization Device (NVD) such as a SmartNIC provides the network traffic a physical proxy to a substrate network on which cloud network abstractions (e.g., cloud service instances) are built. A virtual interface for a SmartNIC provides virtual networking for physical networking resources of the SmartNIC for accessing, connecting, securing, and modifying cloud resources. Typically, a SmartNIC is attached to a computing instance (e.g., a cloud based workstation) within a virtual network. A virtual interface i.e., a Virtual Network Interface Card (VNIC) hosted on the SmartNIC manages communications of the computing instance within and outside the virtual network.

Typically, a single SmartNIC can be exposed as multiple VNICs to host machines within a cloud network where the multiple VNICs may share the same physical network port of the SmartNIC. Customers expect cloud services to be highly available, with minimal downtime, even if there are problems in the underlying infrastructure (e.g., a SmartNIC goes down). To achieve this, cloud service providers build redundancies and backups into their infrastructure to increase bandwidth and to avoid a single point of failure within the cloud infrastructure to ensure a continuous access to cloud services. Implementing backup systems with multiple Smart-NICs is however quite complex, especially when the solution has to scale across the entire distributed cloud infrastructure.

SUMMARY

The present disclosure relates generally to techniques for improving availability of cloud services, and more particularly to techniques for maintaining and replicating network state information across multiple VNICs and their corresponding SmartNICs. Various embodiments are described herein, including methods, systems, non-transitory computer-readable storage media storing programs, code, or instructions executable by one or more processors, and the like.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

An aspect of the present disclosure provides for a method comprising executing, by a network virtualization device (NVD), a set of virtual network interface cards (VNICS), the set of VNICs including a first VNIC performing forwarding of packets for a set of one or more packet flows; storing, by the NVD, a first VNIC-related information, wherein the first VNIC-related information comprises information identifying a first set of one or more packet flows and state information for the first set of one or more packet flows; determining, by the NVD, that the state information for the first VNIC is to be synchronized with another NVD; and responsive to the determining: identifying, by the NVD, a first backup NVD for the first VNIC, wherein the first backup NVD is a backup for the first VNIC; and communicating, by the NVD to the first backup NVD, a portion of the state information stored by the NVD for the first VNIC.

Another aspect of the present disclosure provides for A computer system, comprising: one or more processors; and a non-transitory computer-readable storage medium containing instructions which, when executed on the one or more processors, cause the one or more processors to perform operations including: executing a set of VNICs, the set of VNICs including a first VNIC performing forwarding of packets for a set of one or more packet flows; storing a first VNIC-related information, wherein the first VNIC-related information comprises information identifying a first set of one or more packet flows and state information for the first set of one or more packet flows; determining that the state information for the first VNIC is to be synchronized with another NVD; and responsive to the determining: identifying a first backup NVD for the first VNIC, wherein the first backup NVD is a backup for the first VNIC; and communicating to the first backup NVD a portion of the state information stored by the NVD for the first VNIC.

BRIEF DESCRIPTION OF THE DRAWINGS

Features, embodiments, and advantages of the present disclosure are better understood when the following Detailed Description is read with reference to the accompanying drawings.

FIG. 8A depicts a VNICs and SmartNICs mapping table for a distributed environment incorporating plurality of active and backup-standby VNICs, according to at least one embodiment.

FIG. 8B depicts a simplified block diagram of a distributed environment for synchronizing network state information between plurality of active and backup-standby VNICs, according to at least one embodiment.

FIG. 13 depicts an example flow diagram of steps performed to synchronize network state information between active and backup VNICs, according to at least one embodiment.

FIG. 14 depicts an example flow diagram of steps performed to synchronize network state information of a packet received at an active VNIC to a backup VNIC, according to at least one embodiment.

FIG. 15 depicts an example flow diagram of steps performed to synchronize network state information on a SmartNIC at a startup, according to at least one embodiment.

DETAILED DESCRIPTION

Figure 1:
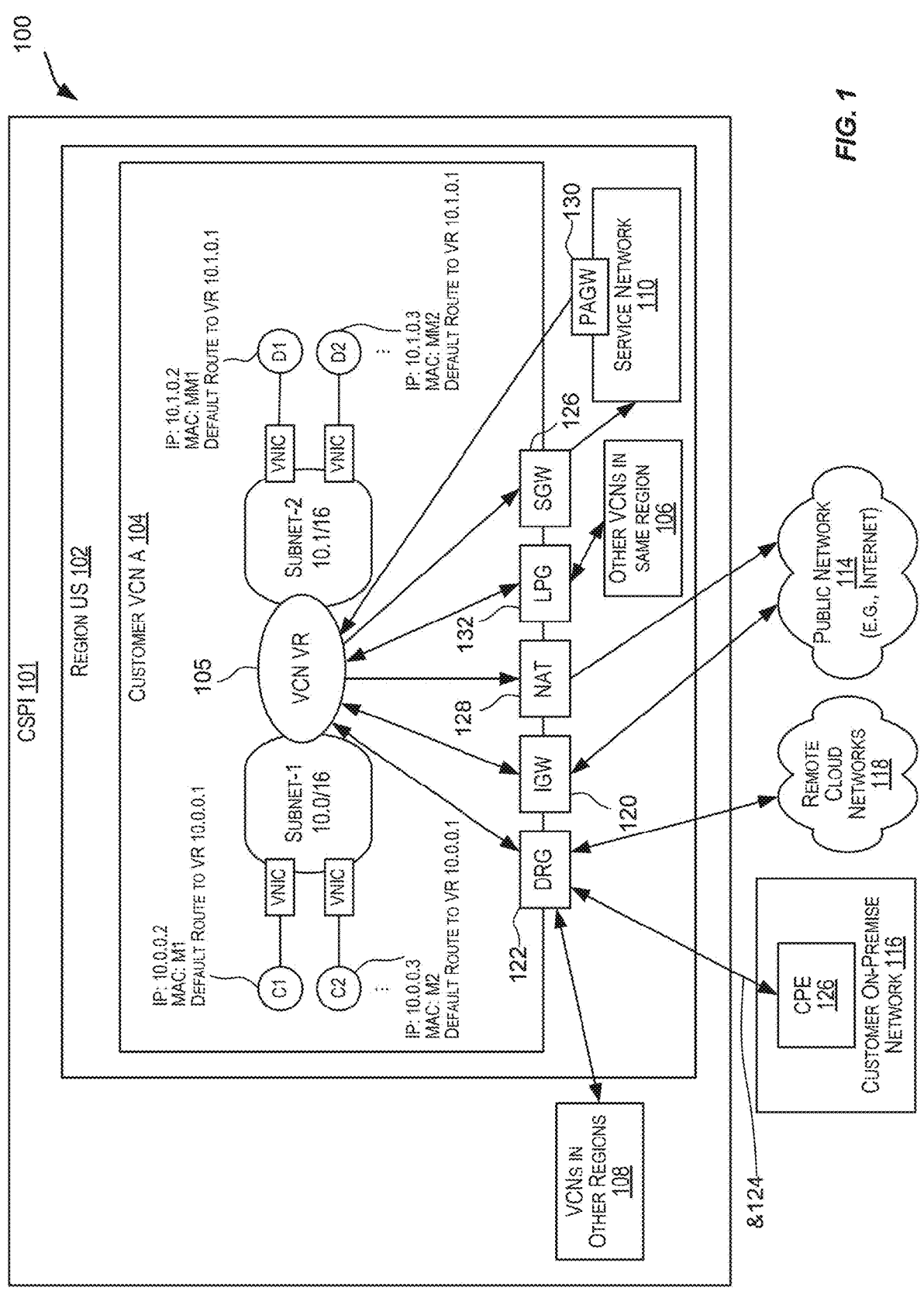
FIG. 1 is a high level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to techniques for synchronizing and maintaining a network state information across multiple VNICs and SmartNICs within a distributed cloud infrastructure. The disclosure presents a method for maintaining network state information for a large volume of network traffic over a cluster of SmartNICs.

Typically, to provide highly available packet processing for a stream of network traffic between virtual cloud networks (e.g., from a customer's network to service provider's network), a pair of VNICs (e.g., primary and secondary VNICs) and SmartNICs may be used. When a failover event is detected within the primary VNIC, a secondary or backup VNIC can take over packet processing.

A primary VNIC is unavailable when its corresponding SmartNIC is unavailable for maintenance or down due to a failover event. Upon detecting an unavailability of the primary VNIC, the network traffic is processed by a secondary VNIC and its corresponding SmartNIC. The secondary VNIC is a backup VNIC paired to the primary VNIC. However, the secondary VNIC is unaware of a state of the stream of packet flows processed by the active VNIC prior to it becoming unavailable for processing the traffic.

Accordingly, for the secondary VNIC (and its corresponding SmartNIC) to process packet flows directed to the primary VNIC, the secondary VNIC is required to re-establish network connections for streams of packet flows directed to the first VNIC. Consequently, the established connections for the packet flows can be timed out before new connections on the secondary VNIC can be re-established. Accordingly, customers lose established connections for packet flows whenever the primary VNIC is down for maintenance, which is a negative customer experience. The present disclosure provides techniques for synchronizing or replicating network state information across multiple network resources to provide a continuous and highly available environment for processing of network traffic. The techniques and methods in the present disclosure describe synchronizing or replicating network state information for multiple Network Virtualization Device(s) (NVDs). While the examples and embodiments illustrated in the disclosure refer to SmartNIC (e.g., a type of NVD), the embodiments can be used to synchronizing and manage network state information for other types of NVDs as well.

Example Architecture of Cloud Infrastructure

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN-IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flex- ibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one end- point to another using network management software. Since the virtual network is built on top of a physical network, communications between components in the virtual network involves both the virtual network and the underlying physi- cal network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facili- tate routing in the virtual network.

Accordingly, physical addresses (e.g., physical IP addresses) are associated with components in physical net- works and overlay addresses (e.g., overlay IP addresses) are associated with entities in virtual networks. Both the physi- cal IP addresses and overlay IP addresses are types of real IP addresses. These are separate from virtual IP addresses, where a virtual IP address maps to multiple real IP addresses. A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connec- tions to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An avail- ability domain may correspond to one or more data centers located within a region. A region can be composed of one or more availability domains. In such a distributed environ- ment, CSPI resources are either region-specific, such as a virtual cloud network (VCN), or availability domain-spe- cific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise net- works, etc.) and to build replicated systems in multiple ADs for both high-availability and disaster recovery. Cloud ser- vices use multiple ADs to ensure high availability and to protect against resource failure. As the infrastructure pro- vided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commer- cial customers. As another example, a realm may be pro- vided for a specific country for customers within that country. As yet another example, a government realm may be provided for a government, and the like. For example, the government realm may be catered for a specific government and may have a heightened level of security than a com- mercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains.

A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC) that enables the compute instance to participate in a subnet of a VCN. A VNIC is a logical representation of physical Network Interface Card (NIC). In general, a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 18, 19, 20, and 21 (see references 1816, 1916, 2016, and 2116) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 18, 19, 20, and 21 are described below. FIG. 1 is a high level diagram of a distributed environment 100 showing an over-lay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is config-ured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, includ-ing compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has a private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These end-points may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., commu-nication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a com-pute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destina-tion compute instance is in the same subnet as the source compute instance, the VNIC associated with the source compute instance is configured to identify the VNIC asso-ciated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs asso-ciated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 18, 19, 20, and 21 (for example, gateways referenced by reference numbers 1834, 1836, 1838, 1934, 1936, 1938, 2034, 2036, 2038, 2134, 2136, and 2138) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 1120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
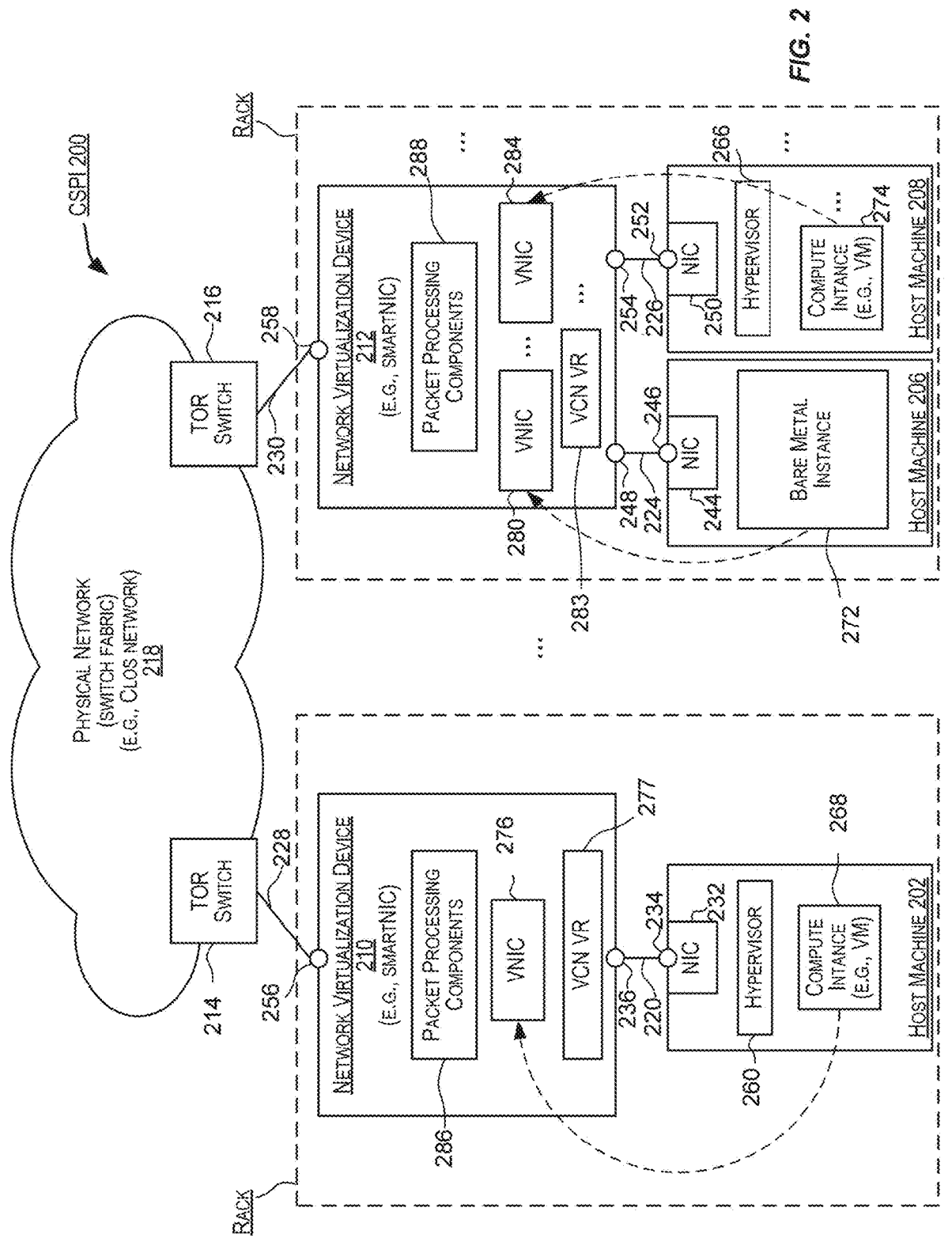
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
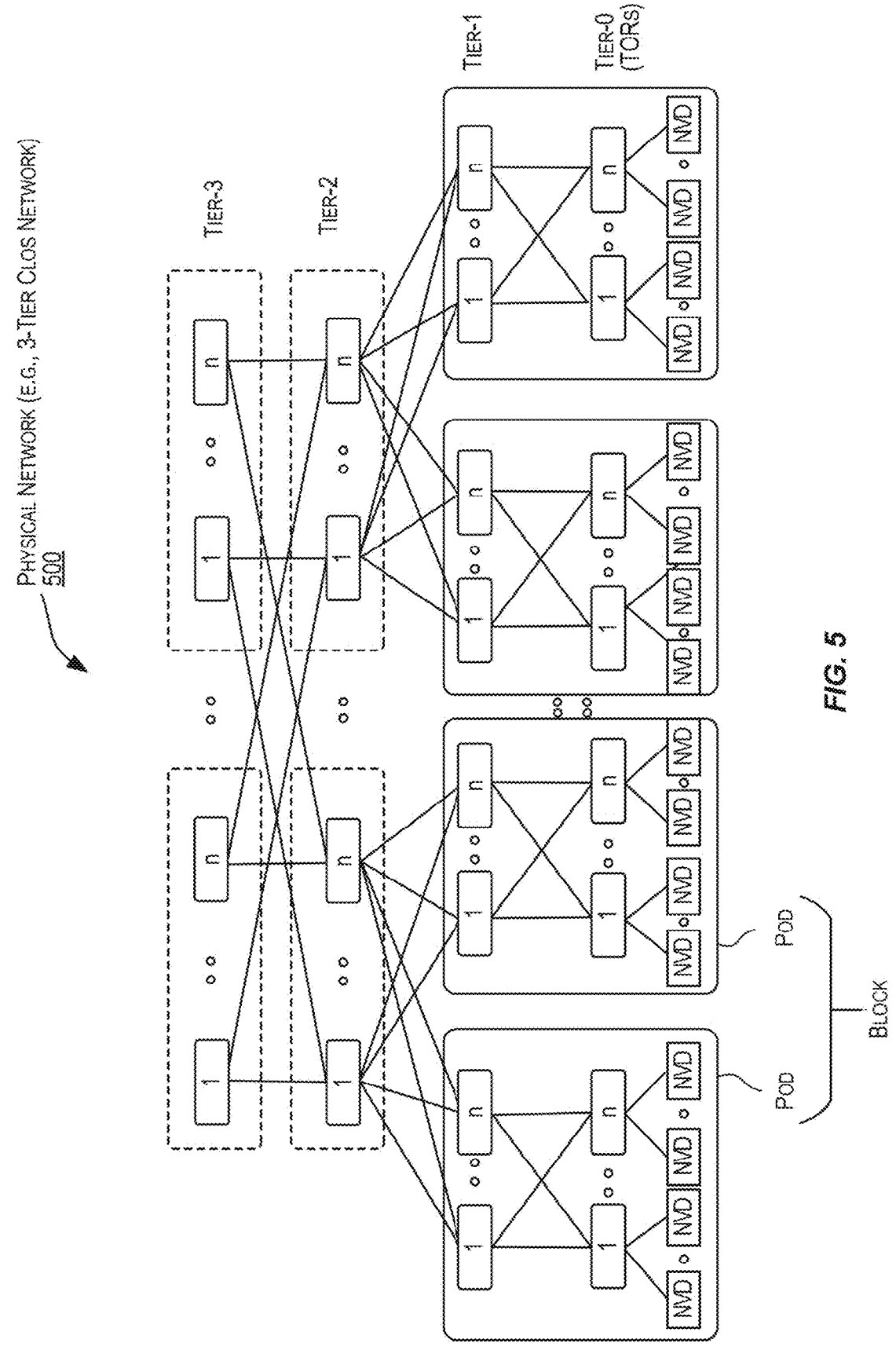
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
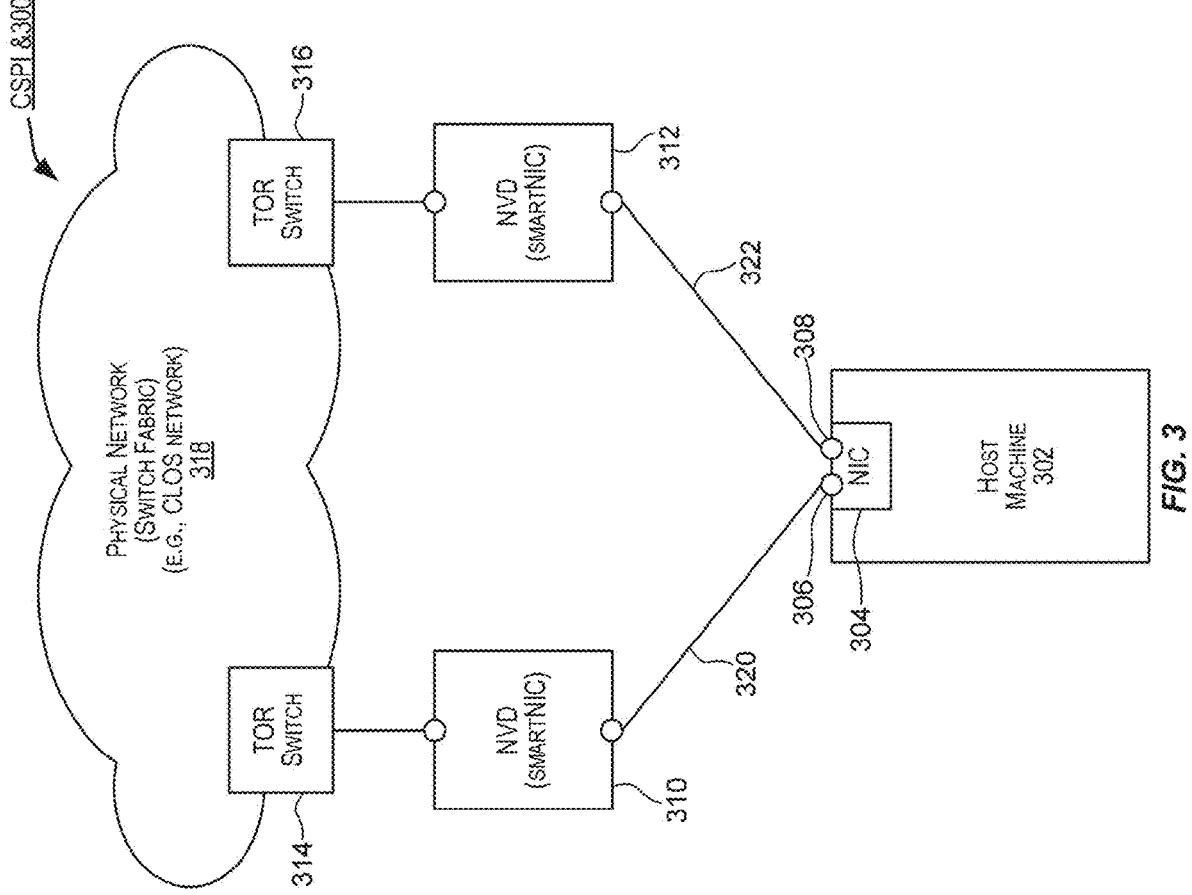
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with cis in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 18, 19, 20, and 21 (see references 1816, 1916, 2016, and 2116) and described below. Examples of a VCN Data Plane are depicted in FIGS. 18, 19, 20, and 21 (see references 1818, 1918, 2018, and 2118) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
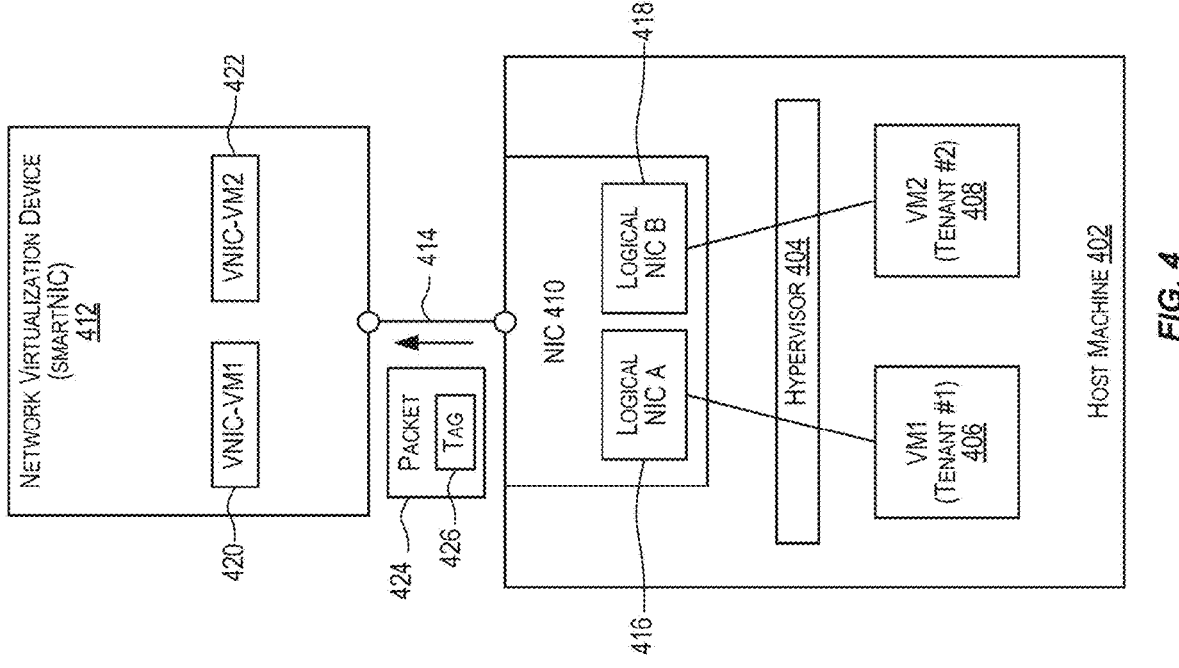
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multi-tenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-O switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The band-width/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's informa-tion and can be used to manage the resource, for example, via a Console or through APIs. An example syntax for a CID is:

> ocid1.<RESOURCE TYPE>.<REALM>.[REGION] [.FUTURE USE].<UNIQUE ID>
> where,
> ocid1: The literal string indicating the version of the CID;
> resource type: The type of resource (for example, instance, volume, VCN, subnet, user, group, and so on);
> realm: The realm the resource is in. Example values are "c1" for the commercial realm, "c2" for the Govern-ment Cloud realm, or "c3" for the Federal Government Cloud realm, etc. Each realm may have its own domain name;
> region: The region the resource is in. If the region is not applicable to the resource, this part might be blank;
> future use: Reserved for future use.
> unique ID: The unique portion of the ID. The format may vary depending on the type of resource or service.

Figure 6:
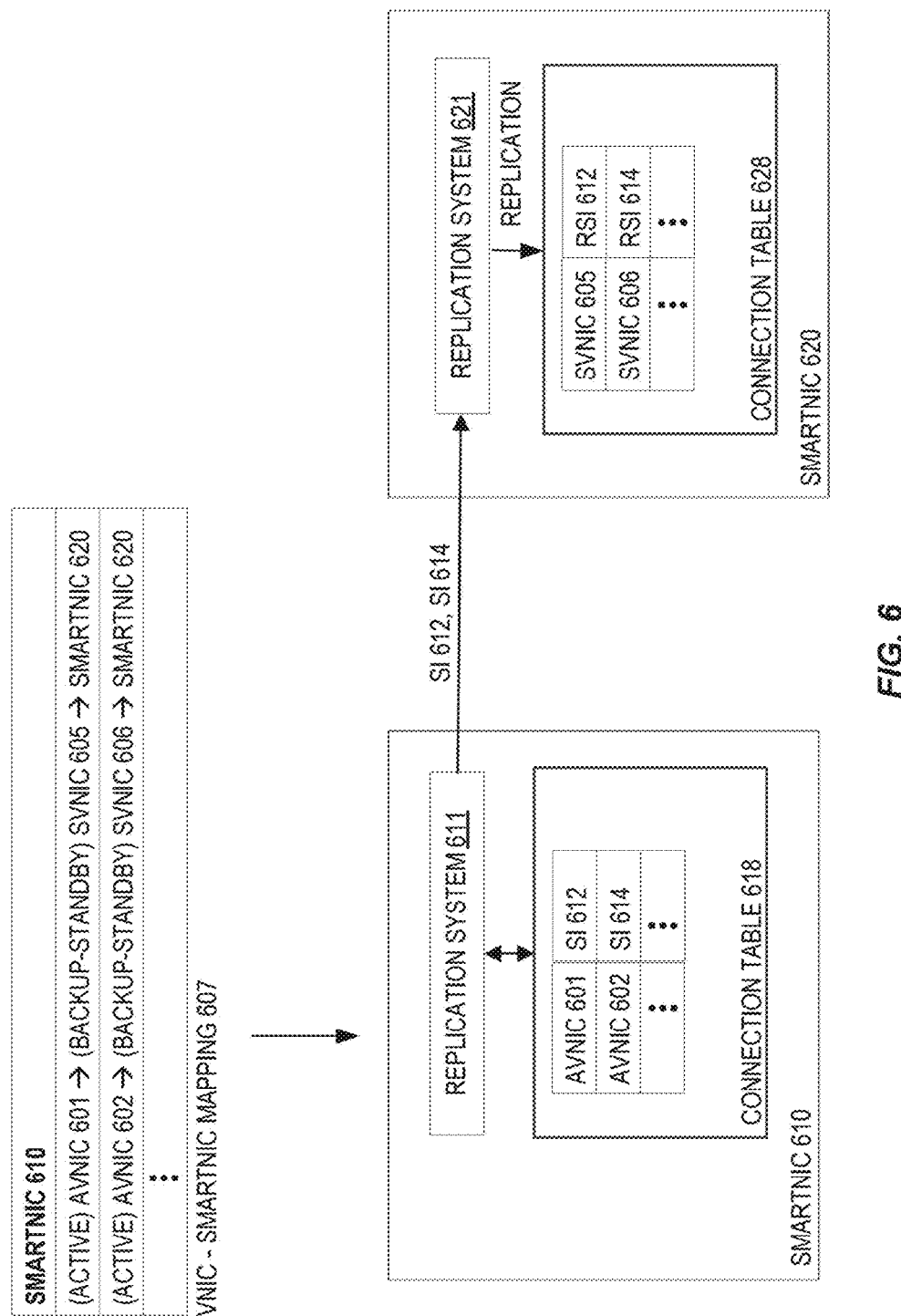
FIG. 6 depicts a simplified block diagram of a distributed environment for synchronizing network state information between active and backup-standby Virtual Network Interface Cards (VNICs), according to at least one embodiment.

FIG. 6 depicts a simplified block diagram of a distributed environment for synchronizing network state information between active and backup-standby VNICs, according to at least one embodiment. As shown, distributed environment 600 may comprise multiple systems communicatively coupled to each other. The systems in FIG. 6 include multiple SmartNICs (SmartNIC 610 and SmartNIC 620), multiple active VNICs (AVNIC 601 and AVNIC 602), and multiple backup-standby VNICs (SVNIC 605 and SVNIC 606).

Distributed environment 600 depicted in FIG. 6 is merely an example and is not intended to unduly limit the scope of claimed embodiments. Many variations, alternatives, and modifications are possible. For example, in some implemen-tations, distributed environment 600 may have more or fewer systems or components than those shown in FIG. 6, may combine two or more systems, or may have a different configuration or arrangement of systems.

In the example embodiment depicted in FIG. 6, a Smart-NIC 610 may include a replication system 611 and a connection table 618. SmartNIC 620 may include a repli-cation system 621 and a connection table 628. The Smart-NIC 610 may host active VNICs (AVNIC 601 and AVNIC 602) and the SmartNIC 620 may host backup-standby VNICs (SVNIC 605 and SVNIC 606). As shown in VNIC—SmartNIC mapping 607, for an active VNIC (AVNIC 601), a backup-standby VNIC is SVNIC 605, and for the active VNIC (AVNIC 602), a backup-standby VNIC is SVNIC 606.

In some implementations, the replication system 611 within the SmartNIC 610 receives network packets to be transported to a destination (e.g., a virtual machine instance within a cloud network). Specifically, the SmartNIC 610 may receive packets that are directed to virtual IP addresses associated with Virtual NICs, AVNIC 601 and AVNIC 602. A compute instance (e.g., a Virtual Machine (VM) within a cloud network) may direct a stream of packets to a virtual IP address associated with the AVNIC 601. The stream of packets directed to the virtual IP address of AVNIC 601 may be received by the SmartNIC 610.

The SmarNIC 610 may process and forward the stream of received packets. Specifically, the replication system 611 may process the received packets. To process the packets, the replication system 611 may hash each of the packets, determine destinations of the packets, encode and decode the packets, and forward the packets to their destinations or an intermediate target which may ultimately forward the packets to their destinations.

According to some embodiments, after processing each packet received at the SmartNIC 610, the replication system 611 may store the state of the packet flow within the connection table 618. The replication system 611 may update the connection table 618 with state information about newly established connection for a packet flow, changed state information for already established connection for the packet flow, or information that an established connection for a packet flow has been terminated. These concepts are further described in detail with reference to FIG. 10 and FIG. 14.

For each packet flow, the connection table 618 may store state information as an entry within the connection table 618. State information (e.g., source port/address, destination port/address, etc.,) for packet flows directed to active VNIC i.e., AVNIC 601 may be labelled as state information (SI) 612. Similarly, state information for packet flows directed to an AVNIC 602 may be labeled as SI 614.

In the above embodiment, a backup-standby VNICs (SVNIC 605 and 606 in SmartNIC 620) may act as a backup for active VNICs (i.e., AVNIC 601 and AVNIC 602, respec-tively). Accordingly, a standby VNIC (SVNIC 605) may be configured to take over processing of network packets in case of failover or time-out situation with an active VNIC or its corresponding SmartNIC 610. To efficiently handle the failover or timeout situations, state information for packet flows received at active VNICs may be synchronized or replicated within the standby-backup VNIC and its corre-sponding SmartNIC 620. Specifically, the replication system 611 may communicate the state information (SI 612 and SI 614) of packet flows associated with VNICS, AVNIC 601 and AVNIC 602, to replication system 621. The replication system 621 may store the state information (i.e., replicated state information (RSI) 612 and RSI 614) of the packet flows associated with VNICs, AVNIC 601 and AVNIC 602, within connection table 628, as shown in FIG. 6. By some embodi-ments, a backup VNIC may be one of two types: active backup VNIC and a standby backup VNIC. An active backup VNIC is one where the VNIC serves as a backup to a primary active VNIC, while at the same time processing other packet flows. In contrast, the standby backup VNIC is one which serves only as a backup to the primary active VNIC i.e., it does not process other packet flows.

Figure 7:
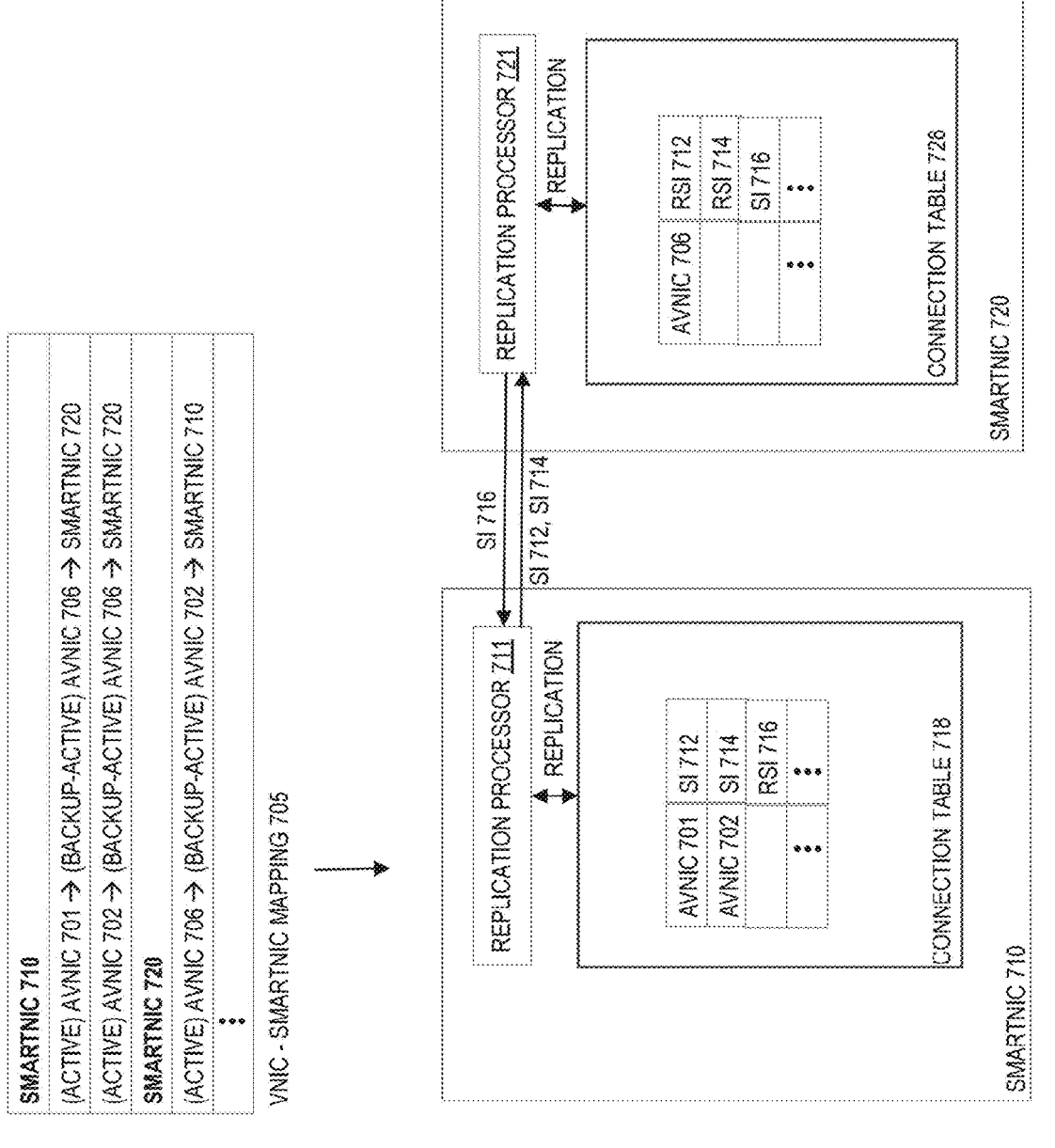
FIG. 7 depicts a simplified block diagram of a distributed environment for synchronizing network state information between active and backup-active VNICs, according to at least one embodiment.

FIG. 7 depicts a simplified block diagram of a distributed environment for synchronizing network state information between active and backup-active VNICs, according to at least one embodiment. As shown, distributed environment 700 may comprise multiple systems communicatively coupled to each other. The systems in FIG. 7 include multiple SmartNICs (SmartNIC 710 and SmartNIC 720) and multiple active VNICs (e.g., AVNIC 701, AVNIC 702, and AVNIC 706). Distributed environment 700 depicted in FIG.

7 is merely an example and is not intended to unduly limit the scope of claimed embodiments.

In the example embodiment depicted in FIG. 7, a Smart-NIC 710 may include a replication system including a replication processor 711, and a connection table 718, and a SmartNIC 720 may include a replication system including a replication processor 721, and a connection table 728. As shown in the VNIC—SmartNIC mapping table 705, for an active VNIC (AVNIC 701), a backup-active VNIC is AVNIC 706, and for the active VNIC (AVNIC 702), a backup-active VNIC is AVNIC 706. In the above example, AVNIC 706 is hosted on a SmartNIC 720.

In some implementations, the SmartNIC 710 may host one or more VNICs (AVNIC 701 and AVNIC 702) which are exposed to host machines within a cloud network (e.g., customer or service provider's cloud networks). The Smart-NIC 710 may receive packets that are directed to virtual IP addresses associated with VNICs (AVNIC 701 and AVNIC 702). A compute instance (e.g., a virtual machine within a host machine) within a cloud virtual network may send a packet to a virtual IP address associated with the AVNIC 701 or the AVNIC 702. The packet sent on either IP address may be received by the associated SmartNIC 710. In some implementations, more than two VNICs may be hosted by the SmartNIC 710.

The replication processor 711 may process packets directed to VNICs associated with the SmartNIC 710. To process a packet, the replication processor 711 may hash the packet to determine packet flow of the packet, determine the destination of the packet, encode and decode the packet, and send the packet to its destination or an intermediate target that forwards the packet to its destination. After processing the packet, the processor 711 may update the connection table 718 to store state information (SI) associated with packet flow of the packet. The connection table 718 may store connection tracking data as an entry within the connection table 718 for each packet flow received by the SmartNIC 710. As shown in FIG. 7, state information for packet flows directed to a VNIC (AVNIC 701) may be labeled as SI 712 and state information for packet flows associated with packets directed to the VNIC (AVNIC 702) may be labeled as SI 714.

For an active VNIC, a backup-active VNIC may be configured to take over the processing of network packets in case of detecting failure or time-out situation with the active VNIC or a SmartNIC associated with the active VNICs (AVNIC 701 or AVNIC 702).

In an example embodiment, both SmartNICs (710 and 720) associated with the active VNICs (AVNIC 701, AVNIC 702, and AVNIC 706) are "Active" SmartNICs which continuously process the network traffic to provide highly available processing environment. For an active VNIC AVNIC 701, the associated backup-active VNIC AVNIC 706 may act as a backup VNIC. Similarly, for an active VNIC (AVNIC 702), the backup-active VNIC (AVNIC 706) may act as a standby VNIC. Accordingly, the SmartNIC 720 associated with the AVNIC 706 may act as a backup SmartNIC for the AVNIC 701 and AVNIC 702. Similarly, for an active VNIC (AVNIC 706), an active-backup VNIC (AVNIC 702) and SmartNIC 710 may act as a backup VNIC and SmartNIC.

For each packet flow, the connection table 718 may store connection tracking data as an entry within the connection table 718. In some implementations, a state information for packet flows directed to a VNIC (AVNIC 701) may be SI 712. Similarly, a state information for packet flows associated with packets directed to a VNIC (AVNIC 702) may be SI 714. In some scenarios, if an active VNIC (AVNIC 701) or it's corresponding SmartNIC 710 are down (e.g., due to failover event or maintenance), the network packets directed to AVNIC 701 may be diverted (e.g., via virtual network routing) to the configured backup-active VNIC (AVNIC 706), and the AVNIC 706 and it's corresponding SmartNIC 720 may take over the processing of network packets directed to the AVNIC 701. Similarly, if an active VNIC (AVNIC 706) or it's corresponding SmartNIC 720 are down, the network packets directed to AVNIC 706 may be diverted to the configured active-backup VNIC AVNIC 702, and the AVNIC 702 and it's corresponding SmartNIC 710 may take over the processing of network packets directed to the AVNIC 706.

To efficiently handle the failover or timeout situations between a pair of active VNIC and a backup-active VNIC, state information for packet flows received at the active VNIC may be synchronized or replicated within the backup-active VNIC and its corresponding SmartNIC. In some implementations, the replication processor 711 may communicate the state information (SI 712 and SI 714) of packet flows associated for VNICs (AVNIC 701 and AVNIC 702) to a replication processor 721 of backup-active VNICs (AVNIC 706) for AVNIC 701 and AVNIC 702. The replication processor 721 may store replicated state information (RSI 712 and RSI 714) of the packet flows associated with VNICs (AVNIC 701 and AVNIC 702) within connection table 728, as shown in FIG. 7. Similarly, state information (SI 716) of packet flows associated with AVNIC 706 may be communicated to the replication system 711 and stored within connection table 718 as RSI 716.

In alternative embodiments, multiple VNICs associated with a SmartNIC may each have multiple backup-active VNICs within different SmartNICs configured as backup VNICs. Accordingly, the state information for packet flows directed to each of the multiple VNICs for the SmartNIC may be replicated within the different smartNICs associated with the multiple backup-active VNICs.

FIG. 8A depicts VNICs and SmartNICs mapping table for a distributed environment incorporating a plurality of active and backup-standby VNICs, according to at least one embodiment. As shown in FIG. 8B, distributed environment 800 may comprise multiple systems communicatively coupled to each other. The systems may include multiple SmartNICs (SmartNIC 810, SmartNIC 820, SmartNIC 830, SmartNIC 840, and SmartNIC 850), multiple active VNICs (AVNIC 802, AVNIC 804, AVNIC 812, 814, AVNIC 842, and AVNIC 844), and multiple backup-standby VNICs (SVNIC 822, SVNIC 824, SVNIC 825, SVNIC 827, SVNIC 828, SVNIC 852, and SVNIC 854). The mapping between these SmartNICs, active VNICs and backup-standby VNICs is shown in FIG. 8A.

As shown in FIG. 8A, backup-standby VNICs 822 and 824 may be configured to be standby routers for the active VNICs 802 and 804, respectively. Similarly, a backup-standby VNIC 825 may be configured to be a backup for the active VNIC 812. The backup SmartNIC 830 may be a backup SmartNIC for active VNICs 802, 804, and 812. In the above instance, VNICs 802 and 804 are hosted on SmartNIC 810 and VNICs 812 and 814 are hosted on SmartNIC 820.

Similarly, backup-standby VNICs 827 and 828 (hosted on SmartNIC 830) may be configured to be backups for the active VNICs 842 and 844 (hosted on SmartNIC 840). Accordingly, the backup SmartNIC 830 may be a backup for active VNICs 842 and 844. Similarly, backup-standby VNICs 852 and 854 may be configured to be standby routers for the active routers 814, 842 and 844. Accordingly, the SmartNIC 850 may be a backup SmartNIC for active VNICs 814, 842, and 844.

FIG. 8B depicts a simplified block diagram of a distributed environment for synchronizing network state information between plurality of active and standby VNICs, according to at least one embodiment. Distributed environment 800 depicted in FIG. 8B is merely an example and is not intended to unduly limit the scope of claimed embodiments. Many variations, alternatives, and modifications are possible. The mappings between SmartNICs, active VNICs, and backup-standby VNICs are shown in FIG. 8A table.

In one implementation, the SmartNICs 810 may receive network packets directed to virtual IP addresses associated with active VNICs 802 and 804. The replication system 801 may process these packets. To process the packet, the replication system 801 may hash the packet, determine the destination of the packet, encode and decode the packet, and send the packet to its destination or an intermediate target that forwards the packet to its destination.

After processing the packet, the system 801 may store the state of the packet flow of the packet within the connection tables 808. Specifically, the state information (SI 806 and SI 807) of packet flows directed to AVNIC 802 and 804 may be saved in connection table 808. Since backup-standby VNICs for AVNIC 802 and 804 are SVNIC 822 and SVNIC 824 (hosted on SmartNIC 830), the state information for packet flows (SI 806 and SI 807) may be forwarded to replication system 821. The replication system 821 then updates the connection table 829 to store replicated state information (RSI 806 and RSI 807) about packet flows directed to AVNIC 802 and 804. Accordingly, for active VNICs 802 and 804, corresponding standby VNICs 822 and 824 (hosted on SmartNIC 830) can take over the processing of network packets in case of a failover event or a time-out situation with the active VNICs (802 and 804) or a SmartNIC 810, using available state information (RSI 806 and 807) stored within connection table 829. It is noted that although in the present embodiment, state information is stored after processing the packet, this is in no way limiting the scope of the present embodiment. Specifically, for a given received packet the operations of processing, storing state information and replication can be performed in any order.

In another implementation, the SmartNIC 820 may receive network packets directed to virtual IP addresses associated with active VNICs 812 and 814. The replication systems 811 may process the packets and forward the packet to its destination. After processing the packet, the replication system 811 may store the state of the packet flow of the packet within the connection tables 818. Specifically, the state information (SI 816 and SI 817) of packet flows directed to AVNIC 812 and 814 may be saved in connection table 818. Since a backup-standby VNIC for AVNIC 812 is SVNIC 825 (hosted on SmartNIC 830) and a backup-standby VNIC for AVNIC 814 is SVNIC 852 (hosted on SmartNIC 850), the state information for packet flows for AVNIC 812 may be forwarded for replication to replication system 821 and state information for packet flows for AVNIC 814 may be forwarded for replication to replication system 851.

The replication systems 821 and 851 then update the connection tables 829 and 859, respectively, to store the state information (RSI 816 and RSI 817). Accordingly, for active VNIC 812, corresponding standby VNIC 825 (hosted on SmartNIC 830) can take over the processing of network packets for AVNIC 812 in failover event or time-out situation with a SmartNIC 820 using available state information (RSI 816) within connection table 829. Similarly, for active VNIC 814, corresponding standby VNIC 852 (hosted on SmartNIC 850) can take over the processing of network packets for AVNIC 814 in failover event or time-out situation with SmartNIC 820 using available state information (RSI 817) within connection table 859.

In another implementation, the SmartNIC 840 may receive network packets directed to virtual IP addresses associated with active VNICs 842 and 844. The replication system 841 may process the packets and forward the packets to their destinations. After processing the packet, the replication system 841 may store the state of the packet flow of the packet within the connection tables 848. Specifically, the state information (SI 846 and SI 847) of packet flows directed to AVNIC 842 and 844 may be saved in connection table 848. Since a backup-standby VNIC for AVNIC 842 is SVNIC 827 (hosted on SmartNIC 830) and SVNIC 852 (hosted on SmartNIC 850), the state information (SI 846) for packet flows for AVNIC 842 may be forwarded for replication to both replication systems 821 and 851. Similarly, since a backup-standby VNIC for AVNIC 844 is SVNIC 828 (hosted on SmartNIC 830) and SVNIC 854 (hosted on SmartNIC 850), the state information (SI 847) for packet flows for AVNIC 844 may be forwarded for replication to both replication systems 821 and 851.

The replication systems 821 and 851 then update the connection table 829 and 859 to store the state information (RSI 846 and RSI 847) for AVNIC 842 and AVNIC 844. Accordingly, for active VNIC 842, one of backup-standby VNICs 827 or 852 can take over the processing of network packets for AVNIC 842 in failover event or time-out situation with a SmartNIC 840 using available state information (RSI 846) within connection tables 829 or 859. Similarly, for active VNIC 844, one of backup-standby VNICs 828 or 854 can take over the processing of network packets for AVNIC 844 in failover event or time-out situation with a SmartNIC 840 using available state information (RSI 847) within connection tables 829 or 859. Accordingly, in the above implementation, the SmartNICs 830 and 850 are both backups for VNICs 842 and 844. By some embodiments, a selection of a backup-standby VNIC from a plurality of backup-standby VNICs (each of which is a backup-standby VNIC for an active VNIC) may be made based on several criteria such as amount of existing traffic (i.e. traffic load) on the corresponding SmartNIC of the backup VNIC, a total number of VNICs included on the corresponding SmartNIC, etc. According to some embodiments, the selection of the backup-standby VNIC from the plurality of backup-standby VNICS may be preconfigured.

Figure 9:
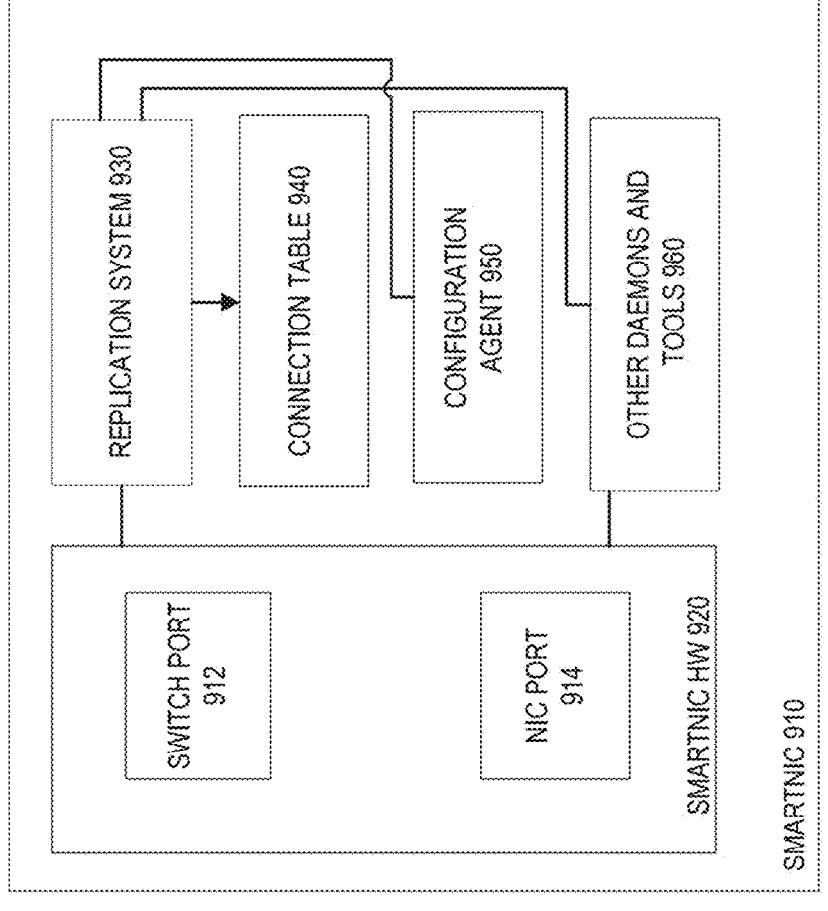
FIG. 9 depicts an example of block diagram showing components within a SmartNIC, according to at least one embodiment.

FIG. 9 depicts a block diagram showing components within a SmartNIC, according to at least one embodiment. As shown in FIG. 9, a SmartNIC 910 may include various components or subsystems including a NIC hardware 920, a replication system 930, a connection table 940, a configuration agent 950, and other daemons and tools 960.

The hardware of a NIC i.e., SmartNIC HW 920 may provide a hardware platform for the SmartNIC 910. The NIC 910 may be physically located within a server host that supplies power and cooling for the SmartNIC. The NIC hardware 920 may include multiple ports such as a switch port 912 and a NIC port 914. In some scenarios, at switch port 912, traffic is received from a Top-of-Rack (TOR) switch. A TOR switch may be a network device that provides layer two and/or layer 3 routing and/or switching functionality for the network traffic received at the SmartNIC 910. In some scenarios, the NIC port 914 may send and receive network packets from a NIC within a host machine where network packets originate.

A replication system 930 is a processing system that processes packets that are received at ports 912 and 914. In some scenarios, after receiving a packet at the NIC port 914, the replication system i.e., a processor included in the replication system 930, may hash the packet to determine a packet flow associated with the packet. Specifically, the processor may hash a header of the packet to determine a packet flow associated with the packet. The header of a first packet may be a standard five-tuple packet header having information about a source IP address, a source port, a destination IP address, a destination port, and a layer 4 protocol (e.g., TCP, UDP). Accordingly, the processor in the replication system 930 may use the hash results to determine a particular packet flow and a current state of the packet flow associated with the received packet. All packets associated with a particular packet flow may contain the same tuple packet header information (e.g., source IP address, port address, protocol, etc.). A protocol of a particular packet flow may be a protocol such as Transmission Control Protocol (TCP), User Datagram Protocol (UDP) or another type of protocol.

After determining the packet flow of a received packet, the replication system 930 may further identify a destination for the packet. The replication system 930 may de-capsulate and encapsulate the packet before sending it to its destination. In some scenarios, the replication system 930 may send the packet to a target which further sends the packet to its destination. In an example implementation, the replication system 930 may parse and process received packets in a linear fashion. After processing and forwarding each packet to its destination, the replication system 930 may determine whether the connection table 940 needs to be updated with the state information of the packet flow.

The connection table 940 may be a table with a list of entries for state information for one or more packet flows. Each entry within the connection table 940 may be a state information (e.g., connection established, terminated, etc.,) for a particular packet flow of a received packet, an associated VNIC where the packet was received, and a backup VNIC information for the VNIC. Additionally, the state information may also include the 5-tuple associated with each packet. In an example connection table 618 (as shown in FIG. 6), the state information SI 612 includes state information for packet flows for VNIC (i.e., AVNIC 601). For each packet flow received by the VNIC 601, the SI 612 may include a separate entry within SI 612 to store state information for the packet flow.

In some implementations, the connection table 940 is cached within the code of replication system 930. In an alternative scenario, the connection table 940 may be stored within a server within the SmartNIC 910. The connection table 940 may also include a creation date and time data for an entry i.e., metadata associated with the entry. The connection table may also include a replication timer for the entry where the replication timer indicates a scheduled time for triggering a replication for the entry.

In some implementations, the replication system 930 may further determine a backup VNIC (e.g., backup-active or backup-standby VNIC) for an updated entry and send the updated entry within connection table 940 to a SmartNIC associated with the backup VNIC. The replication system 930 may use information produced by a configuration agent 950 to determine the backup VNIC and its corresponding SmartNIC for an active VNIC associated with the SmartNIC

910. In certain implementations, the replication system 930 may generate a buffer with one or more entries to be updated and send the buffer to one or more SmartNICs (i.e., the backup SmartNICs of SmartNIC 910) for replication purposes. The replication system 930 may perform a periodic walk-through the table 940 to determine changed entries, and send those entries to SmartNIC(s) associated with backup VNICs for those entries.

The Daemons and tools unit 960 may include one or more processors and memory to provide application level support to VNICs. The one or more processors may monitor interactions within the SmartNIC 910, gather metrics, actively monitor system health, and provide support for operational inspection of the configuration of the SmartNIC 910.

Figure 10B:
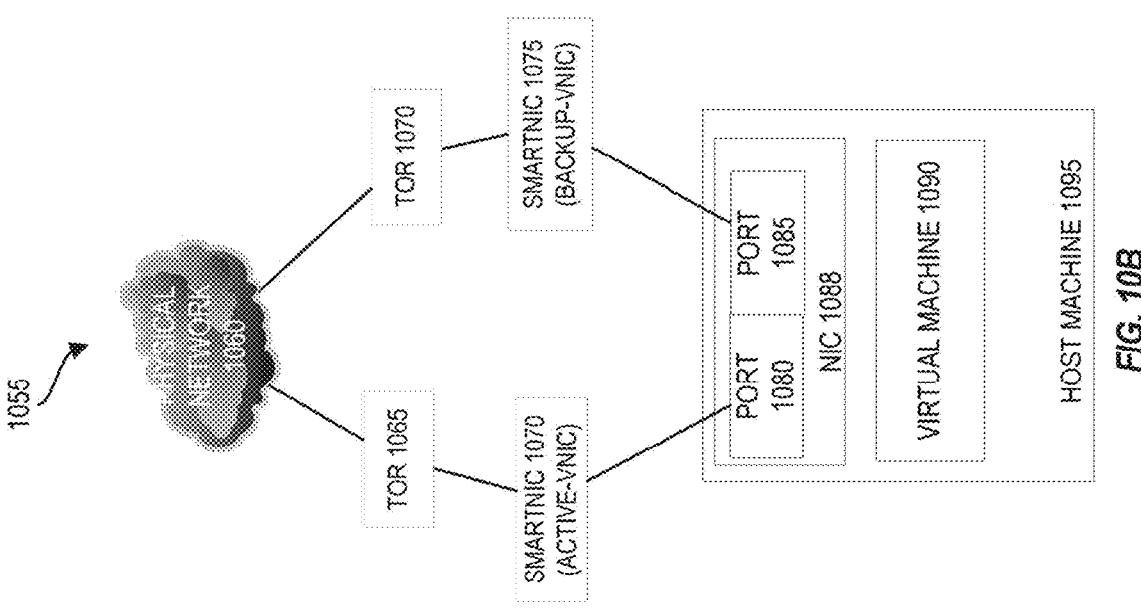
FIG. 10B depicts a block diagram of network design incorporating a pair of Top-of-Rack (TOR) instances for processing network packets, according to at least one embodiment.
Figure 10A:
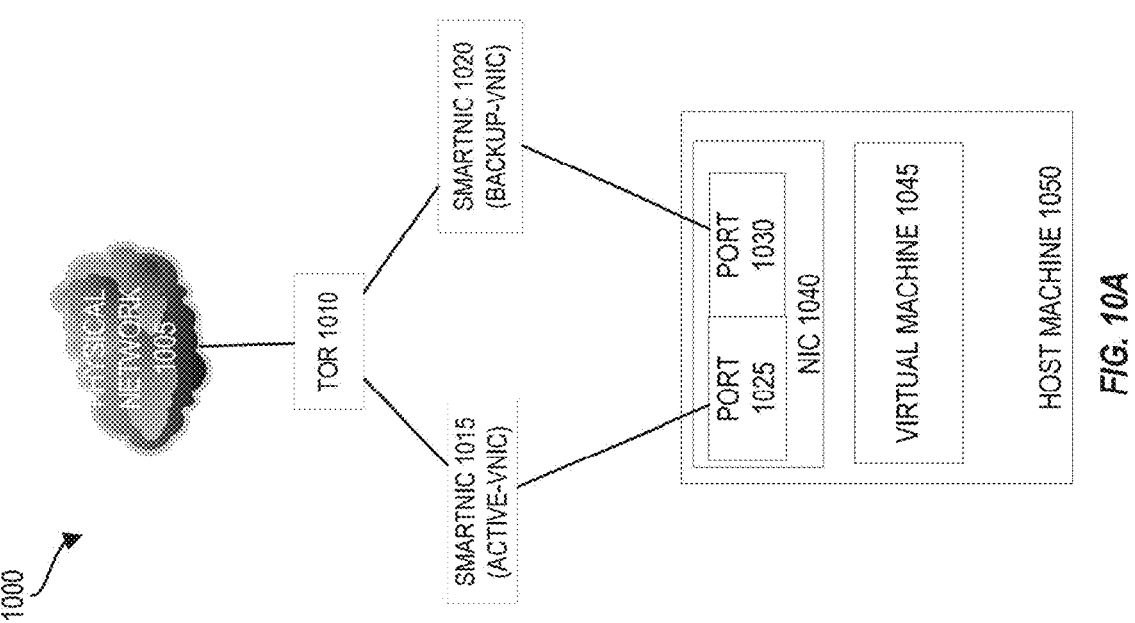
FIG. 10A depicts a block diagram of network design incorporating a pair of SmartNICs for processing network packets, according to at least one embodiment.

FIG. 10A depicts a block diagram of network design incorporating a pair of SmartNICs for processing network packets, according to at least one embodiment. In the embodiment shown in FIG. 10A, a network environment 1000 may include a host machine 1050, SmartNIC 1015, SmartNIC 1020, Top of Rack (TOR) switch 1010, and physical network 1005.

The host machine 1050 may include a virtual machine 1045 and a NIC 1040. Specifically, the host machine 1050 may include a two-port NIC 1040, including ports 1025 and 1030, respectively. In some embodiments, the network packets may originate from the virtual machine 1045. In an example embodiment, these packets may be sent to the Active SmartNIC 1015 via port 1025 connected to the active SmartNIC 1015. Each of the virtual machine 1045 and the host machine 1050 may be identified with a unique Media Access Control (MAC) address.

The SmartNIC 1015 may be identified with multiple IP addresses and MAC addresses. Each SmartNIC port may be connected to switch (TOR) 1010. A TOR switch is a network device that provides layer two (e.g., MAC) and/or layer 3 (e.g., IP) routing and/or switching functionality for the SmartNIC 1015. The TOR switch 1010 may include one or more processors and a memory, and that are capable of executing one or more software processes.

In an example implementation, an active VNIC hosted on the SmartNIC 1015 may be assigned a virtual IP address and a MAC address. The MAC address associated with the VNIC hosted on the SmartNIC 1015 is the MAC address assigned to a port within the SmartNIC 1015. As shown in FIG. 10A, a standby VNIC may be identified as standby for the active VNIC of SmartNIC 1015, where the standby VNIC is hosted on SmartNIC 1020. It must be appreciated that the active VNIC and the standby VNIC may have the same virtual address.

Accordingly, as shown in FIG. 10A, the SmartNIC 1020 may be a backup for an active VNIC of SmartNIC 1015. The state information for the network packets directed to the active VNIC for SmartNIC 1015 may be forwarded to SmartNIC 1020. Specifically, the state information for packets may be sent to TOR switch 1010, and the TOR switch in turn may direct the state information to the SmartNIC 1020. The physical network 1005 may include a plurality of network devices (e.g., routers and/or switches) organized into a plurality of tiers to further process and forward traffic to its destination.

FIG. 10B depicts a block diagram of network design incorporating a pair of Top-of-Rack (TOR) switches for processing network packets, according to at least one embodiment. In the embodiment shown in FIG. 10B, a network environment 1055 may include a host machine 1095, SmartNIC 1070, SmartNIC 1075, Top of Rack (TOR) switches 1065 and 1070, and physical network 1060.

In some implementations, state information of packet flows within a connection table in SmartNIC 1070 may be replicated within SmartNIC 1075. The state information may be transported from the SmartNIC 1070 to SmartNIC 1075 via TOR 1065 and TOR 1070. Specifically, the state information for VNICs within SmartNIC 1070 may be sent to TOR 1065. The TOR 1065 further forwards the state information to the TOR 1070, which eventually forwards the state information to the SmartNIC 1075.

In the above implementation, each NIC port (1080 and 1085) within the NIC 1088 are indirectly connected to TOR switches (1065 and 1070). In the above example, both TORs connected to each other at Layer-2 allows multi-chassis link aggregation groups (MC-LAGs) configuration for replication state information between SmartNICs 1070 and 1075. Accordingly, when failure is detected within a SmartNIC 1070, a backup SmartNIC 1075 can takeover processing of the packets without connections being disrupted (e.g., without disrupting for instance, existing layer 4 connections such as TCP).

Figure 11:
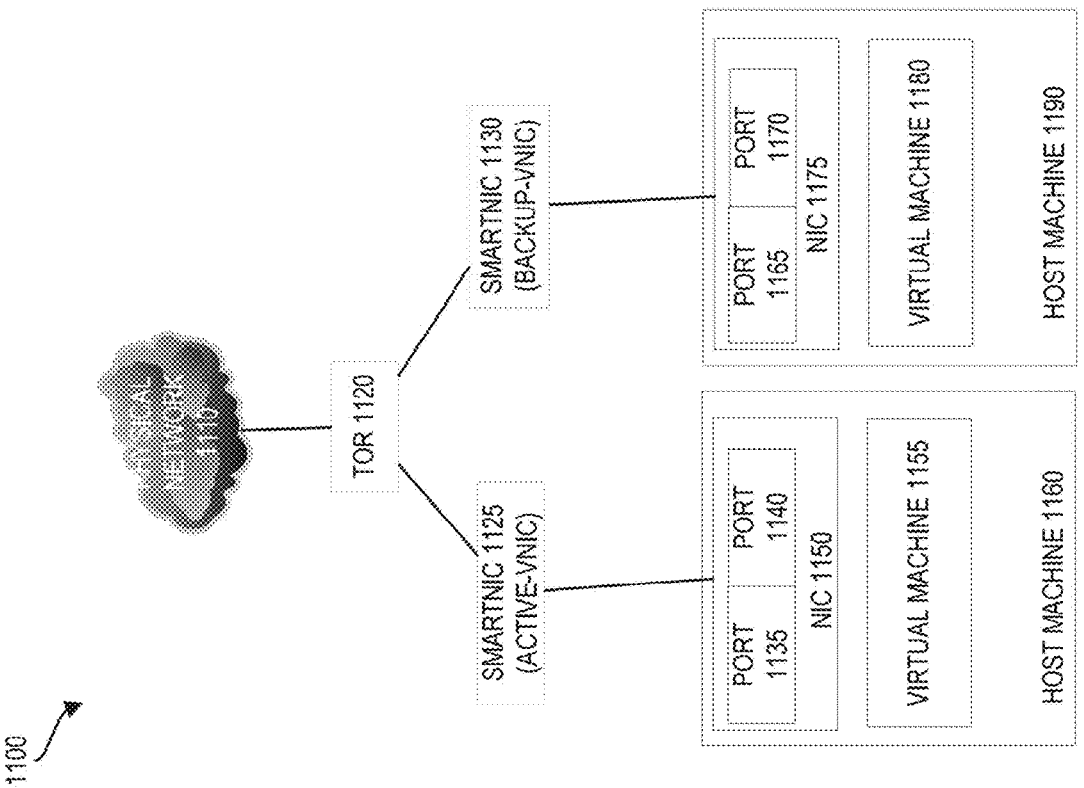
FIG. 11 depicts a block diagram of network design incorporating a pair of SmartNICs and a pair of host machines for processing network packets, according to at least one embodiment.

FIG. 11 depicts a block diagram of network design incorporating a pair of SmartNICs and a pair of host machines for processing network packets, according to at least one embodiment. In the embodiment shown in FIG. 11, a network environment 1100 may include a first host machine 1160, a second host machine 1190, a first SmartNIC 1125, a second SmartNIC 1130, a Top of Rack (TOR) switch 1120, and physical network 1110.

The first host machine 1160 may include a virtual machine 1155 and a NIC 1150. The first host machine 1160 may include a two-port NIC 1150 including ports 1135 and 1140. Network packets are originated at the virtual machine 1155. In an example embodiment, these packets are sent to the first SmartNIC 1125 via one of the ports connected to the NIC 1150. Each of the ports 1135 and 1140 may be identified with a MAC address. The packets may be sent to an active-VNIC associated with the SmartNIC 1125.

The second host machine 1190 may include a virtual machine 1180 and a NIC 1175. The second host machine 1190 may include a two-port NIC 1175 including ports 1165 and 1170. Network packets to be transported to destinations originate from the virtual machine 1180. In an example embodiment, these packets are sent to the SmartNIC 1130 via one of the ports connected to the NIC 1175. The packets may be sent to an active VNIC associated with the Smart-NIC 1130. The active VNIC may act as a backup for the VNIC associated with the SmartNIC 1125. In some implementations, a MAC address of a NIC port within the SmartNIC 1125 may be mapped to a virtual IP address of VNIC (e.g., active-VNIC) associated with SmartNIC 1125.

In the above implementation, while SmartNIC 1130 may actively process packets for host machine 1190, SmartNIC 1130 may also act as a backup for VNICs of SmartNIC 1125. In the above example, a backup VNIC may be identified as a backup-active VNIC for the active VNIC of SmartNIC 1125, where the backup-active VNIC is hosted on SmartNIC 1130. In a similar manner, the SmartNIC 1125 may process packets directed to a VNIC associated with it and also act as a backup for the VNIC (active-VNIC) for SmartNIC 1130. For each SmartNIC (i.e., SmartNIC 1125 and SmartNIC 1130), a switch port may be connected to a TOR switch 1120. The TOR switch may provide layer two (e.g., MAC) and/or layer 3 (e.g., IP) routing and/or switching functionality for both SmartNICs 1125 and 1130. State information for network packets received and processed by an active VNIC associated with a SmartNIC can be sent to the backup SmartNIC for replication via TOR switch 1120.

Figure 12:
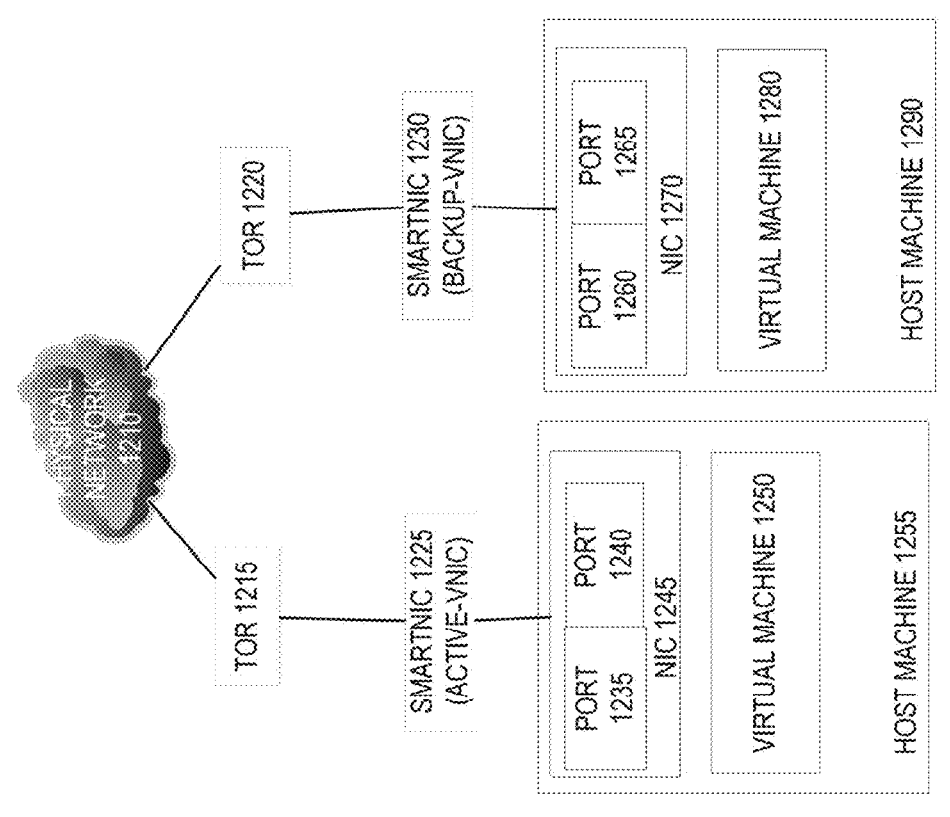
FIG. 12 depicts a block diagram of network design incorporating a pair of SmartNICs, a pair of host machines, and a pair of TOR switches for processing network packets, according to at least one embodiment.

FIG. 12 depicts a block diagram of network design incorporating a pair of SmartNICs, a pair of host machines, and a pair of TOR switches for processing network packets, according to at least one embodiment. In the embodiment shown in FIG. 12, a network environment 1200 may include host machines 1255 and 1290, SmartNICs 1225 and 1230, TOR switches 1215 and 1220, and a physical network 1210.

The host machine 1255 may include a virtual machine 1250 and a NIC 1245. The host machine 1255 may include a two-port NIC 1245 including ports 1235 and 1240, respectively. It is noted that network packets originate at the virtual machine 1250. In an example embodiment, the network packets are sent to the SmartNIC 1225 via one of the ports connected to the NIC 1245. Specifically, the packets may be sent to one or more active VNICs associated with the SmartNIC 1225.

The host machine 1290 may include a virtual machine 1280 and a NIC 1270. The host machine 1290 may include a two-port NIC 1270 including ports 1260 and 1265. Network packets that originate at the virtual machine 1280 are sent to the SmartNIC 1230 via one of the ports connected to the NIC 1270. Specifically, from the NIC 1270, the packets may be sent to an active VNIC associated with the Smart-NIC 1230.

In the above scenario, the active VNIC for SmartNIC 1230 may act as a backup for the VNIC associated with the SmartNIC 1225. While SmartNIC 1230 may actively process packets directed to VNIC of SmartNIC 1230, SmartNIC 1230 may also act as a backup for VNICs of SmartNIC 1225. In the above example, an active VNIC may be identified as a backup-active VNIC for the active VNIC of SmartNIC 1225, where the backup VNIC is hosted on SmartNIC 1230. Accordingly, the SmartNIC 1230 may process packets directed to a VNIC associated with 1230 and also act as a backup for the VNIC (active-VNIC) for SmartNIC 1225.

In some implementations, state information of packet flows maintained within a connection table in SmartNIC 1225 may be replicated in SmartNIC 1230. The state information may be forwarded from the SmartNIC 1225 to SmartNIC 1230 via TOR switches 1215 and 1220, respectively. Specifically, the state information for the active VNIC within SmartNIC 1225 may be sent to TOR 1215. The TOR 1215 further forwards the state information to the TOR 1220, which eventually forwards the state information to the SmartNIC 1230. In the above example, both TOR switches can be connected to each other at Layer-2, which allows for a multi-chassis link aggregation groups (MC-LAGs) to be formed. The MC-LAGs may be used for replicating state information between SmartNICs 1225 and 1230. Accordingly, when failure is detected within a SmartNIC 1225, a backup SmartNIC 1230 can takeover processing of the packets without connections being disrupted using the replicated network state information.

FIG. 13 depicts an example flow diagram of steps performed to synchronize network state from an active VNIC to a backup VNIC, according to at least one embodiment. Specifically, steps provided in FIG. 13 illustrate a method for replicating or synchronizing network state information from the active VNIC to a backup-standby VNIC or a backup-active VNIC.

In step 1310, a SmartNIC executes a set of VNICs. Within the set of VNICs, each VNIC may forward packets for one or more packet flows to one more destinations. As shown in FIG. 6, SmartNIC 610 may execute VNIC 601 where the VNIC 601 (and the SmartNIC 610) may receive, process, and forward packets for various packet flows to one or more destinations (e.g., a virtual machine instance within a cloud network).

In step 1320, for each VNIC within the set of VNICs, the SmartNIC may store a VNIC-related information. The VNIC-related information may include state information for one or more packet flows of packets received at the VNIC. According to some embodiments, the VNIC-related information may also include information identifying one or more backup VNICs for the VNIC associated with the SmartNIC. The one or more backup VNICs may be hosted on another SmartNIC. As shown in FIG. 6, the packets directed to the VNIC 601 are received at SmartNIC 610 and VNIC-related information is SI 612 which is stored within a connection table 618 of the SmartNIC 610.

In step 1330, the SmartNIC may determine whether the state information associated with the VNIC is to be synchronized with another SmartNIC (e.g., a backup Smart-NIC). Specifically, the SmartNIC (610, as shown in FIG. 6) determines whether the state information (SI 612) of the packet flows received at the VNIC needs to be synchronized to another SmartNIC, where the other SmartNIC (620) is a backup for the VNIC (601).

In some scenarios, the SmartNIC may determine to synchronize state information for a packet received at the VNIC to a backup SmartNIC immediately after receiving the packet. For example, if a connection for a packet flow of the received packet at the SmartNIC (610) associated with the VNIC (601) is terminated, the state information of termination may need to be synchronized to the backup SmartNIC (620) immediately after processing the packet.

In some scenarios, the SmartNIC may determine to synchronize state information for packet flows stored within the SmartNIC to a backup SmartNIC on a periodic basis. Specifically, the SmartNIC may be periodically triggered to determine changes within stored state information for the packet flows and forward those changes to the backup SmartNIC. For example, the SmartNIC (or a replication system 611 of FIG. 6) may process and analyze a connection table 618 to identify changes to state information (SI 612) for VNIC (AVNIC 601) and forward those changes to the backup SmartNIC 620 (or a replication system 621) to be stored.

In some scenarios, the SmartNIC may determine to synchronize state information upon a startup of the SmartNIC after experiencing a power off or timeout. Specifically, if the SmartNIC (610) was down due to a failover event or maintenance, the packets are processed by the backup SmartNIC (620) for the VNIC (AVNIC 601) associated with the SmartNIC. After experiencing a timeout or power off, when the SmartNIC (610) comes back online, the SmartNIC may request the backup SmartNIC (620) for the state information (RSI 612) associated with the VNIC (601) and may update the SmartNIC with the received state information.

In step 1340, after determining that the state information for the VNIC needs to be synchronized, the SmartNIC identifies a backup SmartNIC for the VNIC. Based on the mapping information of the VNIC (601) (i.e., stored in table 607), a backup VNIC (605), and its corresponding Smart-NIC (620) may be identified. In some scenarios, the mapping information may be provided to the SmartNIC (e.g., configuration agent within the SmartNIC) during a startup processing of the SmartNIC. In some scenarios, the mapping information may be stored within an Address Resolution Protocol (ARP) table within the SmartNIC.

In step 1350, the SmartNIC may communicate to the backup SmartNIC of the VNIC, a portion of the state information stored by the SmartNIC for the VNIC. Specifically, the SmartNIC (610) may forward a portion of the state information to the backup SmartNIC (620), wherein the portion of the state information is associated with the at least one packet flow received at the VNIC (601).

In step 1360, the backup SmartNIC may store the received portion of the state information associated with the at least one packet flow received at the VNIC. Specifically, the backup SmartNIC (620) (backup of the VNIC AVNIC 601) may store the portion of the state information as state information (RSI 612) for the backup VNIC (SVNIC 605).

FIG. 14 depicts an example flow diagram of steps performed to synchronize network state information of a packet received at an active VNIC to a backup VNIC, according to at least one embodiment. The following steps may be performed to replicate or synchronize state information of a packet flow for a packet received at a SmartNIC.

In step 1410, a packet is received at a first SmartNIC (e.g., 610) from a customer's host machine. The packet may be received at a specific NIC port with MAC address within the SmartNIC (e.g., 610). Upon the packet originating from the customer's host machine, the packet may be directed to a first VNIC (e.g., AVNIC 601), where the first VNIC is hosted on the first SmartNIC (e.g., 610). Accordingly, the packet directed to the first VNIC (e.g., AVNIC 601) hosted on the first SmartNIC (e.g., 610) is received at the port within the first smartNIC (e.g., 610).

After receiving the packet, a first replication system (e.g., 611) within the first SmartNIC (e.g., 610) may process the received packet. Specifically, the first replication system (e.g., 611) may determine state information associated with the packet. The replication system (e.g., 611) may identify the particular packet flow of the packet by hashing the header of the packet and analyzing one or more field information (e.g., a source IP address, a source port, a destination IP address, a destination port, and a layer 4 protocol) of the hashed data of the header.

In step 1420, the first replication system (e.g., 611) determines whether a first connection table (e.g., 618) is to be updated with regards to the received packet. To determine whether the first connection table needs to be updated, the replication system may first determine whether the connection associated with the packet flow of the packet can be tracked. A packet flow with stateful connection (e.g., stateful TCP connection) is tracked within the first connection table but packet flow with stateless connection is not required to be tracked within the first connection table. After determining that the packet flow involves a stateful connection, the replication system determines whether the state information for the packet flow is stored within the first connection table. If the first connection table has the state information of the packet flow stored then the packet flow is not required to be updated.

In an alternative scenario, if the first connection table (e.g., 618) does not have state information for the packet flow of the received packet stored, then the first connection table is updated with the state information (e.g., SI 612). The connection table (e.g., 618) may need to be updated if 1) a new connection for the particular packet flow is established, 2) a state of the particular packet flow has changed, or 3) a connection for the particular packet flow needs to be terminated.

In step 1430, upon determining that the first connection table (e.g., 618) needs to be updated, the first replication system (e.g., 611) may update the first connection table (e.g., 618) with the updated state information for the particular packet flow.

In step 1440, after updating the first connection table (e.g., 618) with state information of the particular packet flow, the first replication system (e.g., 611) may determine whether the updated state information for the particular packet flow (of the received packet) needs to be replicated within a second SmartNIC (e.g., 620). The second SmartNIC (e.g., 620) is a backup SmartNIC for the first VNIC (e.g., AVNIC 601) of the first SmartNIC (e.g., 610). In some implementations, a state information specific to establishing connection for the particular packet flow or terminating connection for the particular packet flow may need to be replicated immediately to the second SmartNIC (e.g., 620). However, other types of updates to the state information may not need to be replicated immediately to the second SmartNIC (e.g., 620), but may be replicated at a later time on a periodic basis.

In some implementations, for an established connection, a replication timer for an entry associated with the particular packet flow of the received packet may be changed after the received packet is processed. Specifically, the replication system (e.g., 611) may reset a replication timer for entry associated with the packet flow of the received packet. Depending on the type of packet flow and its state, the replication timer may vary from seconds to tens of hours. The replication system (e.g., 611) determines that the state information for the packet flow of the received packet needs to be replicated after the replication timer is up. Accordingly, for established connections, state information is not immediately replicated for every packet.

In some scenarios, while processing a packet with an established connection, the replication system (e.g., 611) may look up an entry for the packet flow associated with the packet and a replication timer associated with the entry within the connection table (e.g., 618). If the timer is less than a certain predetermined threshold e.g., 2 minutes, then the replication system (e.g., 611) determines to replicate the state information or entry immediately after the packet processing is completed.

In other scenarios, if the replication timer is less than a certain threshold e.g., 60 minutes, the replication system (e.g., 611) may schedule replication for the entry to be performed on the next walk through of the connection table (e.g., 618). In alternative scenarios, if the replication system determines that the entry cannot be extended then the replication for the entry may be scheduled at the end of the current walk through cycle e.g., 59 minutes.

In step 1450, after determining that the state information for the particular packet flow needs to be replicated, the first replication system 611 may identify the second SmartNIC (e.g., 620) for the active VNIC (e.g., AVNIC 601). To identify a backup SmartNIC (e.g., 620), the replication system 611 may make an ARP inquiry to ARP table for a second VNIC or a backup VNIC (e.g., SVNIC 605) for the first VNIC (e.g., AVNIC 601). In some implementations, information about the second VNIC (e.g., SVNIC 605) and its corresponding second SmartNIC (e.g., 620) may be available in the connection table (e.g., 618).

In step 1460, once the first replication system (e.g., 611) identifies the backup or second SmartNIC for the active VNIC (e.g., AVNIC 601), the first replication system (e.g., 611) communicates an entry associated with the state information for the particular packet flow within the connection table (e.g., 618) to a second replication system (e.g., 621) of the identified backup or second SmartNIC (e.g., 620). Specifically, the first replication system (e.g., 611) of the first SmartNIC (e.g., 610) may forward an entry for state information for the particular packet flow to the second replication system (e.g., 621) of the second SmartNIC (e.g., 620).

In step 1470, once the second replication system (e.g., 621) receives the entry including state information for the particular packet flow, the replication system (e.g., 621) updates a second connection table (e.g., 628) with state information for the particular packet flow.

FIG. 15 depicts an example flow diagram of steps performed to synchronize network state information on a SmartNIC at a startup, according to at least one embodiment. Specifically, the following steps discuss synchronization of network state on a SmartNIC that comes online after being powered off or being unavailable for maintenance.

In step 1510, start-up processes are initiated on the SmartNIC (e.g., 610) once the SmartNIC comes online after being unavailable or powered down. In certain scenarios, a SmartNIC may be unavailable if the SmartNIC is down due to a failover event, or if the SmartNIC is timed out for performing maintenance operations on the SmartNIC. After resolving the failover event or completing the maintenance, the SmartNIC is brought up online. Once the SmartNIC (e.g., 610) comes online, a replication system (e.g., 611) may perform start-up processing.

In step 1520, the replication system (e.g., 611) may further determine one or more VNIC(s) (e.g., AVNIC 601, AVNIC 602) associated with the SmartNIC (e.g., 610). The replication system (e.g., 611) may further determine backup VNICs (e.g., SVNIC 605 and SVNIC 606) for the one or more VNIC(s) (e.g., AVNIC 601, AVNIC 602).

In step 1530, the replication system (e.g., 611) further determines one or more backup SmartNIC(s) (e.g., 620) for the VNIC(s) (e.g., AVNIC 601, AVNIC 602). The backup VNIC(s) (e.g., SVNIC 605, 606) are hosted on the backup SmartNIC(s) (e.g., 620).

In step 1540, the replication system (e.g., 611) further requests the backup SmartNIC(s) for state information for packet flows associated with the one or more VNIC(s). Specifically, the replication system (e.g., 611) requests replication system(s) (e.g., 621) within the backup SmartNIC(s) (e.g., 620) for state information for packet flows associated with the one or more VNIC(s).

In step 1550, the replication system (e.g., 611) may receive the state information from the backup SmartNIC(s). In some scenarios, the replication system (e.g., 611) may receive the entire connection table (e.g., 628) from the backup SmartNIC(s) (e.g., 620). In alternative scenarios, the replication system (e.g., 611) may receive network packets with sequence of entries including state information for the packet flows associated with the one or more VNICs.

In step 1560, once the replication system (e.g., 611) receives state information from the backup SmartNIC(s), the replication system (e.g., 611) may update a connection table with the received state information.

Figure 16:
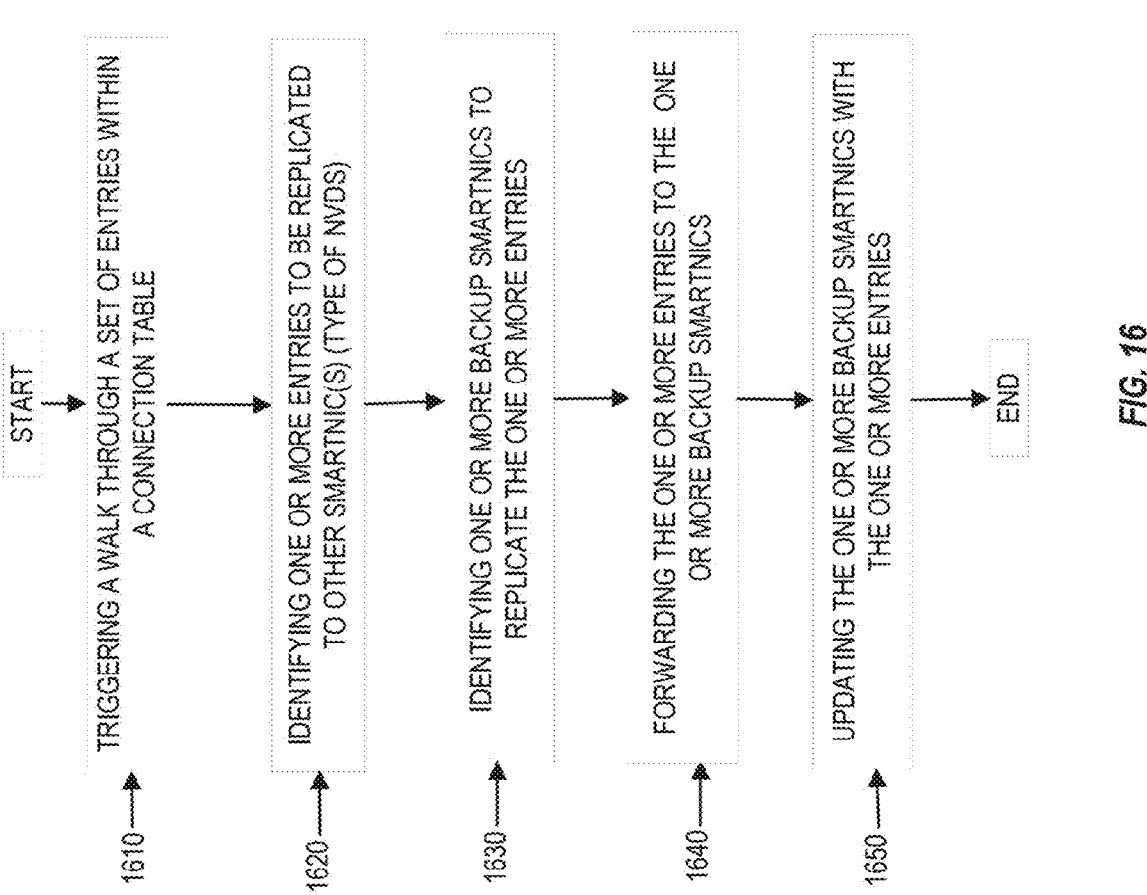
FIG. 16 depicts an example flow diagram of steps performed for a periodic synchronization of state information of packet flows received at an active VNIC to a backup VNIC, according to at least one embodiment.

FIG. 16 depicts an example flow diagram of steps performed for a periodic synchronization of state information of packet flows associated with a VNIC to a backup VNIC, according to at least one embodiment. Specifically, the flow diagram disclosed in FIG. 16 shows steps for replicating or synchronizing state information for packets directed to a VNIC to its backup SmartNIC.

In step 1610, a replication system (e.g., 611) may trigger a walk-through of a connection table i.e., analyze and process the connection table (e.g., 618) to evaluate entries within the table (e.g., 618) within the SmartNIC (e.g., 610). The walk through the connection table may include iterating through all entries within the table. The replication system may trigger the walk-through the connection table on a periodic basis.

In step 1620, the replication system (e.g., 611) may further identify one or more entries to be replicated to other SmartNICs. In one implementation, the replication system (e.g., 611) analyzes each entry within the connection table (e.g., 618). If an entry has changed then the replication system (e.g., 611) may mark the entry to be transported for replication. In other implementations, the replication system (e.g., 611) may check a replication timer for an entry. If the entry is scheduled to be replicated according to the replication timer, the replication system (e.g., 611) identifies the entry to be replicated.

In an alternative scenario, the entry may not be identified to be replicated if the replication system (e.g., 611) determines that the entry is not scheduled to be replicated based on the replication timer. The replication system (e.g., 611) may extend the replication timer after determining that the timer for a specific packet flow for the entry can be extended e.g., when there is no change in state information of the packet. In some implementations, on every periodic walk through the connection table, a replication timer can be extended and replication may be scheduled at different times for particular entries associated with state information for particular packet flows.

In some implementations, entries associated with state information of switching to and from an established state for a packet flow are only identified to be replicated to avoid a slowdown in processing packets. If state information specific to establishing or terminating a connection is only identified to be replicated, overhead associated with replicating all updates to state information may be reduced. In the above scenario, upon detecting a failure in the SmartNIC, when the backup SmartNIC takes over processing, it still has information on the already established connection, and therefore, customers may only lose connections that are being established at the moment when the SmarNIC went down due to failure.

In step 1630, the replication system (e.g., 611) may identify one or more backup SmartNICs for the identified entries to be replicated to other SmartNICs. Specifically, the replication system (e.g., 611) first identifies one or more VNICs (e.g., 601) associated with the identified entries from the connection table (e.g., 618). The replication system (e.g., 611) may further determine backup router(s) (e.g., 605) for the one or more VNICs (e.g., 601) and SmartNIC(s) (e.g., 620) corresponding to the backup router(s). In some scenarios, mapping information of the VNIC, backup VNIC and associated SmartNICs may be available within the replication table (e.g., 618). In some scenarios, the backup VNICs and corresponding SmartNICs for the VNIC may be determined dynamically using Gratuitous Address Resolution Protocol (GARP) requests.

In step 1640, the replication system forwards the one or more changed entries to be replicated to the identified SmartNICs(s) of the backup VNIC(s). Specifically, replication system (e.g., 611) forwards the one or more changed entries within the connection table (e.g., 618) to the replication system (e.g., 621) of the SmartNICs(s) (e.g., 620) for the backup VNIC(s) (e.g., 605).

In some implementations, the replication system (e.g., 611) may copy the one or more identified entries (from step 1620) to a buffer. A buffer may include a fixed number of entries. The replication system (e.g., 611) may then create packets (e.g., User Datagram Protocol (UDP) packet) for entries to be replicated or communicated to the other Smart- NICs. The replication system (e.g., 611) may also update payload of the packets with the state information of the one or more entries to be replicated. The replication system (e.g., 611) then queues the packets to be processed and forwarded to the replication system(s) (e.g., 621) of identified Smart-NICs associated with the backup VNICs for the entries.

In above scenario, if the buffer is filled up while walking through the connection table, the replication system may process the buffer to be forwarded after it is full. The replication system (e.g., 611) may continue to walk through the connection table where it stopped and continue processing of the additional buffer.

In step 1650, a replication table(s) within the identified SmartNICs associated with the backup VNICs are updated with state information from the received packets.

Figure 17:
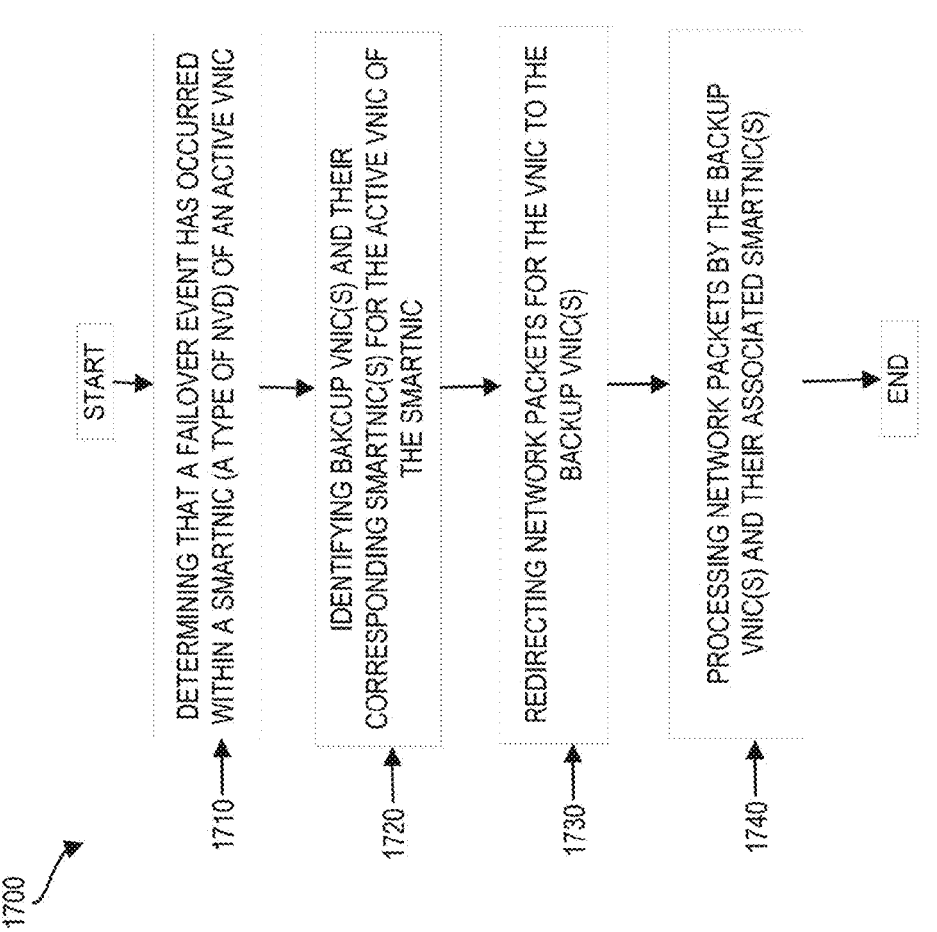
FIG. 17 depicts an example flow diagram of steps performed for processing network packets upon a failover event, according to at least one embodiment.

FIG. 17 depicts an example flow diagram of steps performed for processing network packets upon a failover event, according to at least one embodiment. Specifically, the steps shown in FIG. 17 describes a method for processing network packets upon detecting a failure within a SmartNIC processing the packets.

In step 1710, a failover event which has occurred with respect to a SmartNIC (e.g., 610) associated with an active VNIC (e.g., 601) is detected. In an example scenario, a continuous health monitoring of the active VNIC (e.g., 601) may be performed to detect a failure or timeout event within the SmartNIC (e.g., 610). In some scenarios, backup VNIC (e.g., 605) of the active VNIC (e.g., 601) may monitor health of the active VNIC to detect a failover or timeout event with the SmartNIC (e.g., 610).

In step 1720, upon determining that a failover or a timeout event has occurred within the active VNIC (e.g., 601), backup VNIC(s) and their corresponding SmartNIC(s) for the active VNIC are identified. To identify backup VNIC(s) for the active VNIC (e.g., 601), a proxy GARP may be generated upon detection of the failover or timeout event. The proxy GARP may identify backup VNIC(s) and their corresponding SmartNIC(s) dynamically after detecting the failover or timeout event.

In step 1730, after identifying the backup VNIC(s) and their corresponding SmartNIC(s), the network packets directed to the active VNIC are directed to the backup VNIC(s). Once the packets are redirected, the backup VNIC(s) becomes new-active VNIC(s). A redirecting operation to backup VNIC(s) may require active-backup configuration to be distributed to plurality of peer VNICs in the cloud network.

In step 1740, the backup VNIC(s) and their corresponding SmartNIC(s) may start receiving packets directed to the active VNIC. In the above scenario, no state information is being sent for replication within the backup VNIC(s) (now-active VNIC(s)). However, the SmartNIC(s) associated with the backup VNIC(s) may update its connection table with state information of the packet flows received at the backup VNIC(s).

In the above embodiment, due to dynamic redirecting of the network packets to the backup VNIC(s), session timeouts and negative customer experience due to failover or maintenance events may be avoided. In other embodiments, similar failover solutions may be implemented for TOR or host NIC associated with the active VNIC. In certain scenarios, if there is a failover event detected within a TOR associated with the active VNIC, a compute capacity for processing packets for the active VNIC (and corresponding SmartNIC) may be lost until the failover within TOR is identified and SmartNICs are updated to send traffic towards a backup TOR. Similar to SmartNIC, a health check for a TOR may be performed and a backup TOR may be used automatically upon detecting failure within the TOR.

Example Cloud Infrastructure

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 18:
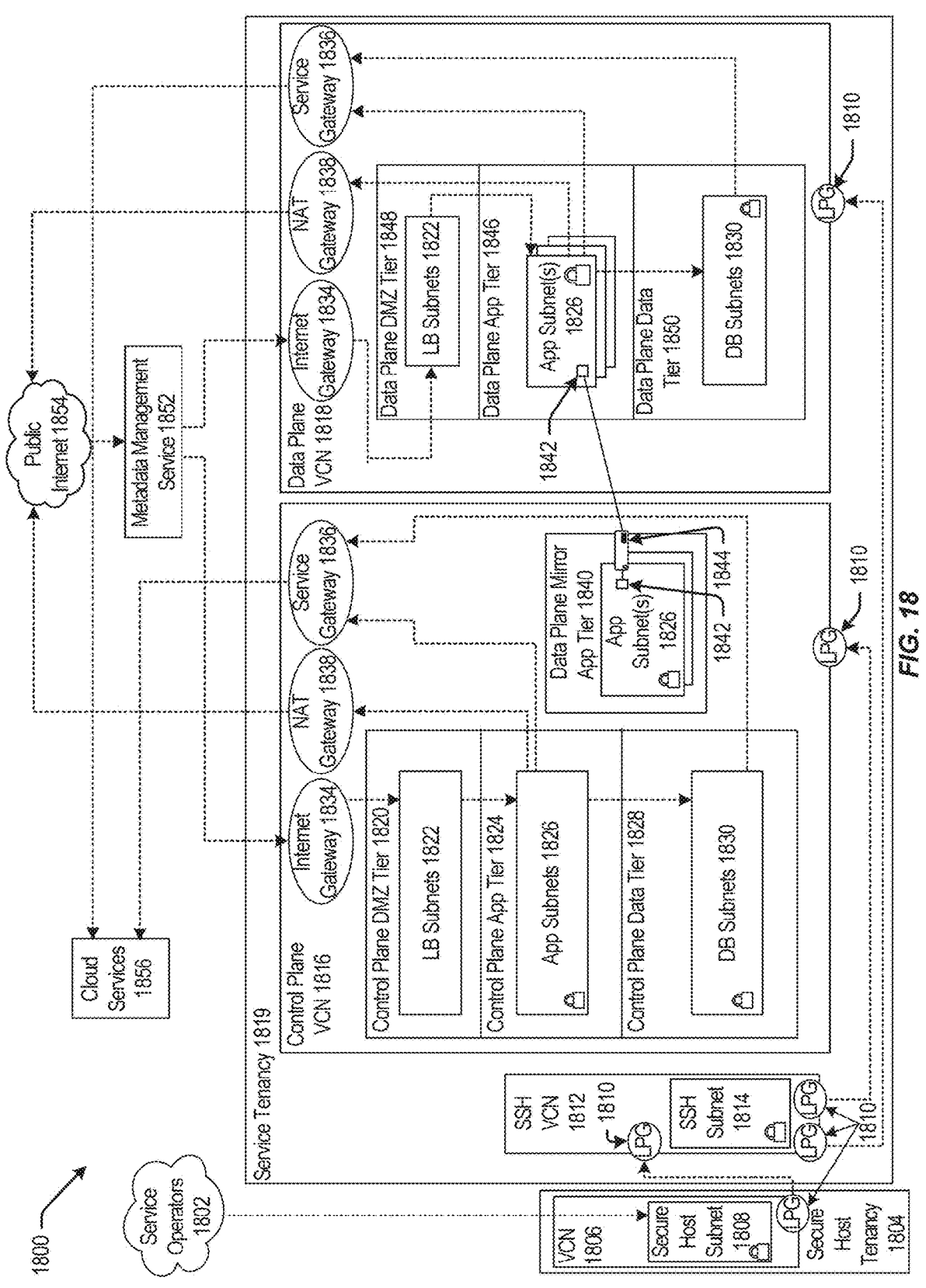
FIG. 18 is a block diagram illustrating one pattern for implementing a cloud infrastructure as a service system, according to at least one embodiment.

FIG. 18 is a block diagram 1800 illustrating an example pattern of an IaaS architecture, according to at least one embodiment. Service operators 1802 can be communicatively coupled to a secure host tenancy 1804 that can include a virtual cloud network (VCN) 1806 and a secure host subnet 1808. In some examples, the service operators 1802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1806 and/or the Internet.

The VCN 1806 can include a local peering gateway (LPG) 1810 that can be communicatively coupled to a secure shell (SSH) VCN 1812 via an LPG 1810 contained in the SSH VCN 1812. The SSH VCN 1812 can include an SSH subnet 1814, and the SSH VCN 1812 can be communicatively coupled to a control plane VCN 1816 via the LPG 1810 contained in the control plane VCN 1816. Also, the SSH VCN 1812 can be communicatively coupled to a data plane VCN 1818 via an LPG 1810. The control plane VCN 1816 and the data plane VCN 1818 can be contained in a service tenancy 1819 that can be owned and/or operated by the IaaS provider.

The control plane VCN 1816 can include a control plane demilitarized zone (DMZ) tier 1820 that acts as a perimeter network (e.g., portions of a corporate network between the corporate intranet and external networks). The DMZ-based servers may have restricted responsibilities and help keep security breaches contained. Additionally, the DMZ tier 1820 can include one or more load balancer (LB) subnet(s) 1822, a control plane app tier 1824 that can include app subnet(s) 1826, a control plane data tier 1828 that can include database (DB) subnet(s) 1830 (e.g., frontend DB subnet(s) and/or backend DB subnet(s)). The LB subnet(s) 1822 contained in the control plane DMZ tier 1820 can be communicatively coupled to the app subnet(s) 1826 contained in the control plane app tier 1824 and an Internet gateway 1834 that can be contained in the control plane VCN 1816, and the app subnet(s) 1826 can be communicatively coupled to the DB subnet(s) 1830 contained in the control plane data tier 1828 and a service gateway 1836 and a network address translation (NAT) gateway 1838. The control plane VCN 1816 can include the service gateway 1836 and the NAT gateway 1838.

The control plane VCN 1816 can include a data plane mirror app tier 1840 that can include app subnet(s) 1826. The app subnet(s) 1826 contained in the data plane mirror app tier 1840 can include a virtual network interface controller (VNIC) 1842 that can execute a compute instance 1844. The compute instance 1844 can communicatively couple the app subnet(s) 1826 of the data plane mirror app tier 1840 to app subnet(s) 1826 that can be contained in a data plane app tier 1846.

The data plane VCN 1818 can include the data plane app tier 1846, a data plane DMZ tier 1848, and a data plane data tier 1850. The data plane DMZ tier 1848 can include LB subnet(s) 1822 that can be communicatively coupled to the app subnet(s) 1826 of the data plane app tier 1846 and the Internet gateway 1834 of the data plane VCN 1818. The app subnet(s) 1826 can be communicatively coupled to the service gateway 1836 of the data plane VCN 1818 and the NAT gateway 1838 of the data plane VCN 1818. The data plane data tier 1850 can also include the DB subnet(s) 1830 that can be communicatively coupled to the app subnet(s) 1826 of the data plane app tier 1846.

The Internet gateway 1834 of the control plane VCN 1816 and of the data plane VCN 1818 can be communicatively coupled to a metadata management service 1852 that can be communicatively coupled to public Internet 1854. Public Internet 1854 can be communicatively coupled to the NAT gateway 1838 of the control plane VCN 1816 and of the data plane VCN 1818. The service gateway 1836 of the control plane VCN 1816 and of the data plane VCN 1818 can be communicatively couple to cloud services 1856.

In some examples, the service gateway 1836 of the control plane VCN 1816 or of the data plan VCN 1818 can make application programming interface (API) calls to cloud services 1856 without going through public Internet 1854. The API calls to cloud services 1856 from the service gateway 1836 can be one-way: the service gateway 1836 can make API calls to cloud services 1856, and cloud services 1856 can send requested data to the service gateway 1836. But, cloud services 1856 may not initiate API calls to the service gateway 1836.

In some examples, the secure host tenancy 1804 can be directly connected to the service tenancy 1819, which may be otherwise isolated. The secure host subnet 1808 can communicate with the SSH subnet 1814 through an LPG 1810 that may enable two-way communication over an otherwise isolated system. Connecting the secure host subnet 1808 to the SSH subnet 1814 may give the secure host subnet 1808 access to other entities within the service tenancy 1819.

The control plane VCN 1816 may allow users of the service tenancy 1819 to set up or otherwise provision desired resources. Desired resources provisioned in the control plane VCN 1816 may be deployed or otherwise used in the data plane VCN 1818. In some examples, the control plane VCN 1816 can be isolated from the data plane VCN 1818, and the data plane mirror app tier 1840 of the control plane VCN 1816 can communicate with the data plane app tier 1846 of the data plane VCN 1818 via VNICs 1842 that can be contained in the data plane mirror app tier 1840 and the data plane app tier 1846.

In some examples, users of the system, or customers, can make requests, for example create, read, update, or delete (CRUD) operations, through public Internet 1854 that can communicate the requests to the metadata management service 1852. The metadata management service 1852 can communicate the request to the control plane VCN 1816 through the Internet gateway 1834. The request can be received by the LB subnet(s) 1822 contained in the control plane DMZ tier 1820. The LB subnet(s) 1822 may determine that the request is valid, and in response to this determination, the LB subnet(s) 1822 can transmit the request to app subnet(s) 1826 contained in the control plane app tier 1824. If the request is validated and requires a call to public Internet 1854, the call to public Internet 1854 may be transmitted to the NAT gateway 1838 that can make the call to public Internet 1854. Memory that may be desired to be stored by the request can be stored in the DB subnet(s) 1830.

In some examples, the data plane mirror app tier 1840 can facilitate direct communication between the control plane VCN 1816 and the data plane VCN 1818. For example, changes, updates, or other suitable modifications to configuration may be desired to be applied to the resources contained in the data plane VCN 1818. Via a VNIC 1842, the control plane VCN 1816 can directly communicate with, and can thereby execute the changes, updates, or other suitable modifications to configuration to, resources contained in the data plane VCN 1818.

In some embodiments, the control plane VCN 1816 and the data plane VCN 1818 can be contained in the service tenancy 1819. In this case, the user, or the customer, of the system may not own or operate either the control plane VCN 1816 or the data plane VCN 1818. Instead, the IaaS provider may own or operate the control plane VCN 1816 and the data plane VCN 1818, both of which may be contained in the service tenancy 1819. This embodiment can enable isolation of networks that may prevent users or customers from interacting with other users', or other customers', resources. Also, this embodiment may allow users or customers of the system to store databases privately without needing to rely on public Internet 1854, which may not have a desired level of security, for storage.

In other embodiments, the LB subnet(s) 1822 contained in the control plane VCN 1816 can be configured to receive a signal from the service gateway 1836. In this embodiment, the control plane VCN 1816 and the data plane VCN 1818 may be configured to be called by a customer of the IaaS provider without calling public Internet 1854. Customers of the IaaS provider may desire this embodiment since database(s) that the customers use may be controlled by the IaaS provider and may be stored on the service tenancy 1819, which may be isolated from public Internet 1854.

Figure 19:
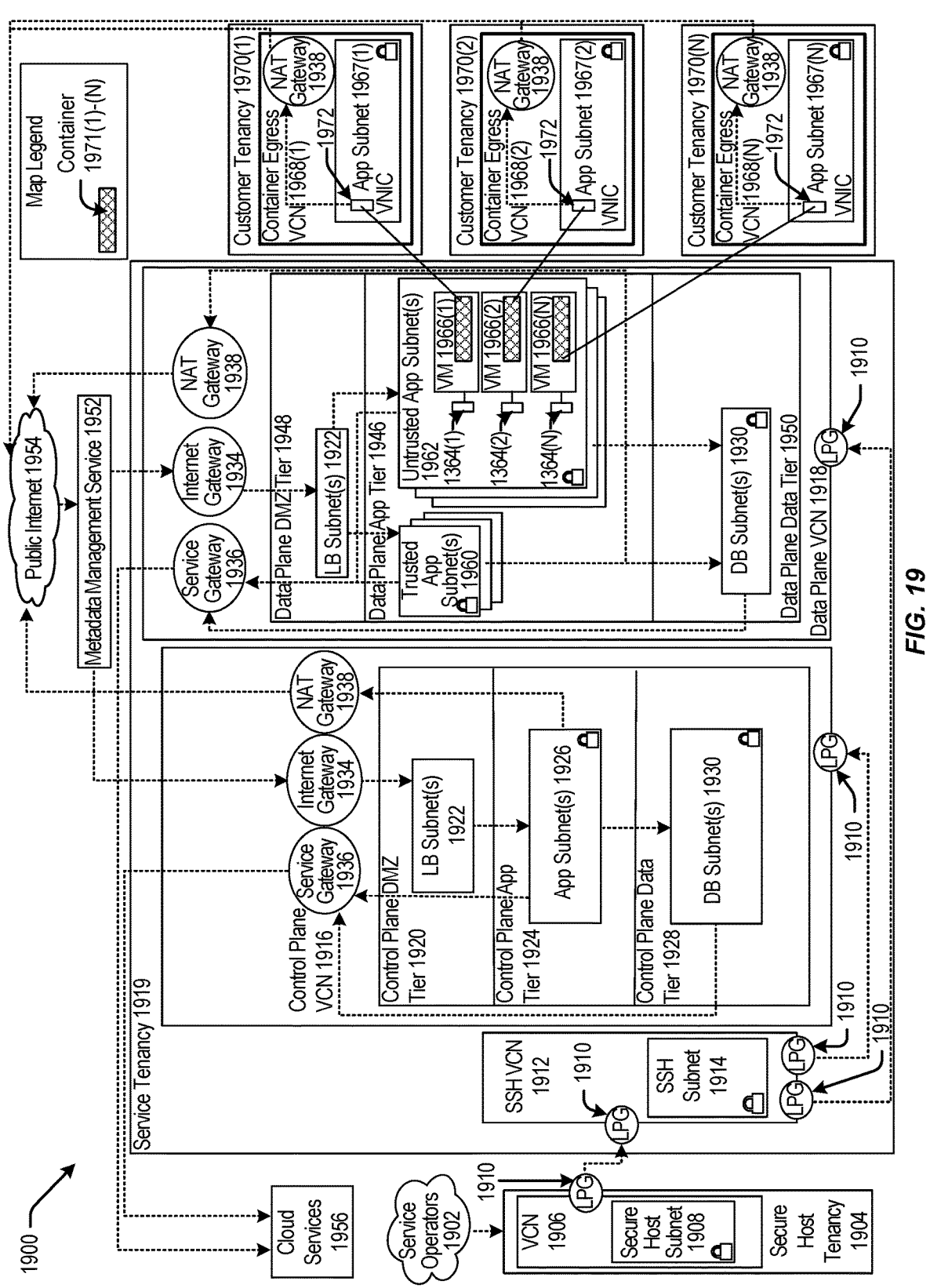
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g. service operators 1802 of FIG. 18) can be communicatively coupled to a secure host tenancy 1904 (e.g. the secure host tenancy 1804 of FIG. 18) that can include a virtual cloud network (VCN) 1906 (e.g. the VCN 1806 of FIG. 18) and a secure host subnet 1908 (e.g. the secure host subnet 1808 of FIG. 18). The VCN 1906 can include a local peering gateway (LPG) 1910 (e.g. the LPG 1810 of FIG. 18) that can be communicatively coupled to a secure shell (SSH) VCN 1912 (e.g. the SSH VCN 1812 of FIG. 18) via an LPG 1810 contained in the SSH VCN 1912. The SSH VCN 1912 can include an SSH subnet 1914 (e.g. the SSH subnet 1814 of FIG. 18), and the SSH VCN 1912 can be communicatively coupled to a control plane VCN 1916 (e.g. the control plane VCN 1816 of FIG. 18) via an LPG 1910 contained in the control plane VCN 1916. The control plane VCN 1916 can be contained in a service tenancy 1919 (e.g. the service tenancy 1819 of FIG. 18), and the data plane VCN 1918 (e.g. the data plane VCN 1818 of FIG. 18) can be contained in a customer tenancy 1921 that may be owned or operated by users, or customers, of the system.

The control plane VCN 1916 can include a control plane DMZ tier 1920 (e.g. the control plane DMZ tier 1820 of FIG. 18) that can include LB subnet(s) 1922 (e.g. LB subnet(s) 1822 of FIG. 18), a control plane app tier 1924 (e.g. the control plane app tier 1824 of FIG. 18) that can include app subnet(s) 1926 (e.g. app subnet(s) 1826 of FIG. 18), a control plane data tier 1928 (e.g. the control plane data tier 1828 of FIG. 18) that can include database (DB) subnet(s) 1930 (e.g. similar to DB subnet(s) 1830 of FIG. 18). The LB subnet(s) 1922 contained in the control plane DMZ tier 1920 can be communicatively coupled to the app subnet(s) 1926 contained in the control plane app tier 1924 and an Internet gateway 1934 (e.g. the Internet gateway 1834 of FIG. 18) that can be contained in the control plane VCN 1916, and the app subnet(s) 1926 can be communicatively coupled to the DB subnet(s) 1930 contained in the control plane data tier 1928 and a service gateway 1936 (e.g. the service gateway of FIG. 18) and a network address translation (NAT) gateway 1938 (e.g. the NAT gateway 1838 of FIG. 18). The control plane VCN 1916 can include the service gateway 1936 and the NAT gateway 1938.

The control plane VCN 1916 can include a data plane mirror app tier 1940 (e.g. the data plane mirror app tier 1840 of FIG. 18) that can include app subnet(s) 1926. The app subnet(s) 1926 contained in the data plane mirror app tier 1940 can include a virtual network interface controller (VNIC) 1942 (e.g. the VNIC of 1842) that can execute a compute instance 1944 (e.g. similar to the compute instance 1844 of FIG. 18). The compute instance 1944 can facilitate communication between the app subnet(s) 1926 of the data plane mirror app tier 1940 and the app subnet(s) 1926 that can be contained in a data plane app tier 1946 (e.g. the data plane app tier 1846 of FIG. 18) via the VNIC 1942 contained in the data plane mirror app tier 1940 and the VNIC 1942 contained in the data plan app tier 1946.

The Internet gateway 1934 contained in the control plane VCN 1916 can be communicatively coupled to a metadata management service 1952 (e.g. the metadata management service 1852 of FIG. 18) that can be communicatively coupled to public Internet 1954 (e.g. public Internet 1854 of FIG. 18). Public Internet 1954 can be communicatively coupled to the NAT gateway 1938 contained in the control plane VCN 1916. The service gateway 1936 contained in the control plane VCN 1416 can be communicatively couple to cloud services 1956 (e.g. cloud services 1856 of FIG. 18).

In some examples, the data plane VCN 1918 can be contained in the customer tenancy 1921. In this case, the IaaS provider may provide the control plane VCN 1916 for each customer, and the IaaS provider may, for each customer, set up a unique compute instance 1944 that is contained in the service tenancy 1919. Each compute instance 1944 may allow communication between the control plane VCN 1916, contained in the service tenancy 1919, and the data plane VCN 1918 that is contained in the customer tenancy 1921. The compute instance 1944 may allow resources that are provisioned in the control plane VCN 1916 that is contained in the service tenancy 1919, to be deployed or otherwise used in the data plane VCN 1918 that is contained in the customer tenancy 1921.

In other examples, the customer of the IaaS provider may have databases that live in the customer tenancy 1921. In this example, the control plane VCN 1916 can include the data plane mirror app tier 1940 that can include app subnet(s) 1926. The data plane mirror app tier 1940 can reside in the data plane VCN 1918, but the data plane mirror app tier 1940 may not live in the data plane VCN 1918. That is, the data plane mirror app tier 1940 may have access to the customer tenancy 1921, but the data plane mirror app tier 1940 may not exist in the data plane VCN 1918 or be owned or operated by the customer of the IaaS provider. The data plane mirror app tier 1940 may be configured to make calls to the data plane VCN 1918 but may not be configured to make calls to any entity contained in the control plane VCN 1916. The customer may desire to deploy or otherwise use resources in the data plane VCN 1918 that are provisioned in the control plane VCN 1916, and the data plane mirror app tier 1940 can facilitate the desired deployment, or other usage of resources, of the customer.

In some embodiments, the customer of the IaaS provider can apply filters to the data plane VCN 1918. In this embodiment, the customer can determine what the data plane VCN 1918 can access, and the customer may restrict access to public Internet 1954 from the data plane VCN 1918. The IaaS provider may not be able to apply filters or otherwise control access of the data plane VCN 1918 to any outside networks or databases. Applying filters and controls by the customer onto the data plane VCN 1918, contained in the customer tenancy 1921, can help isolate the data plane VCN 1918 from other customers and from public Internet 1954.

In some embodiments, cloud services 1956 can be called by the service gateway 1936 to access services that may not exist on public Internet 1954, on the control plane VCN 1916, or on the data plane VCN 1918. The connection between cloud services 1956 and the control plane VCN 1916 or the data plane VCN 1918 may not be live or continuous. Cloud services 1956 may exist on a different network owned or operated by the IaaS provider. Cloud services 1956 may be configured to receive calls from the service gateway 1936 and may be configured to not receive calls from public Internet 1954. Some cloud services 1956 may be isolated from other cloud services 1956, and the control plane VCN 1916 may be isolated from cloud services 1956 that may not be in the same region as the control plane VCN 1916. For example, the control plane VCN 1916 may be located in "Region 1," and cloud service "Deployment 13," may be located in Region 1 and in "Region 2." If a call to Deployment 13 is made by the service gateway 1936 contained in the control plane VCN 1916 located in Region 1, the call may be transmitted to Deployment 13 in Region 1. In this example, the control plane VCN 1916, or Deployment 13 in Region 1, may not be communicatively coupled to, or otherwise in communication with, Deployment 13 in Region 2.

Figure 20:
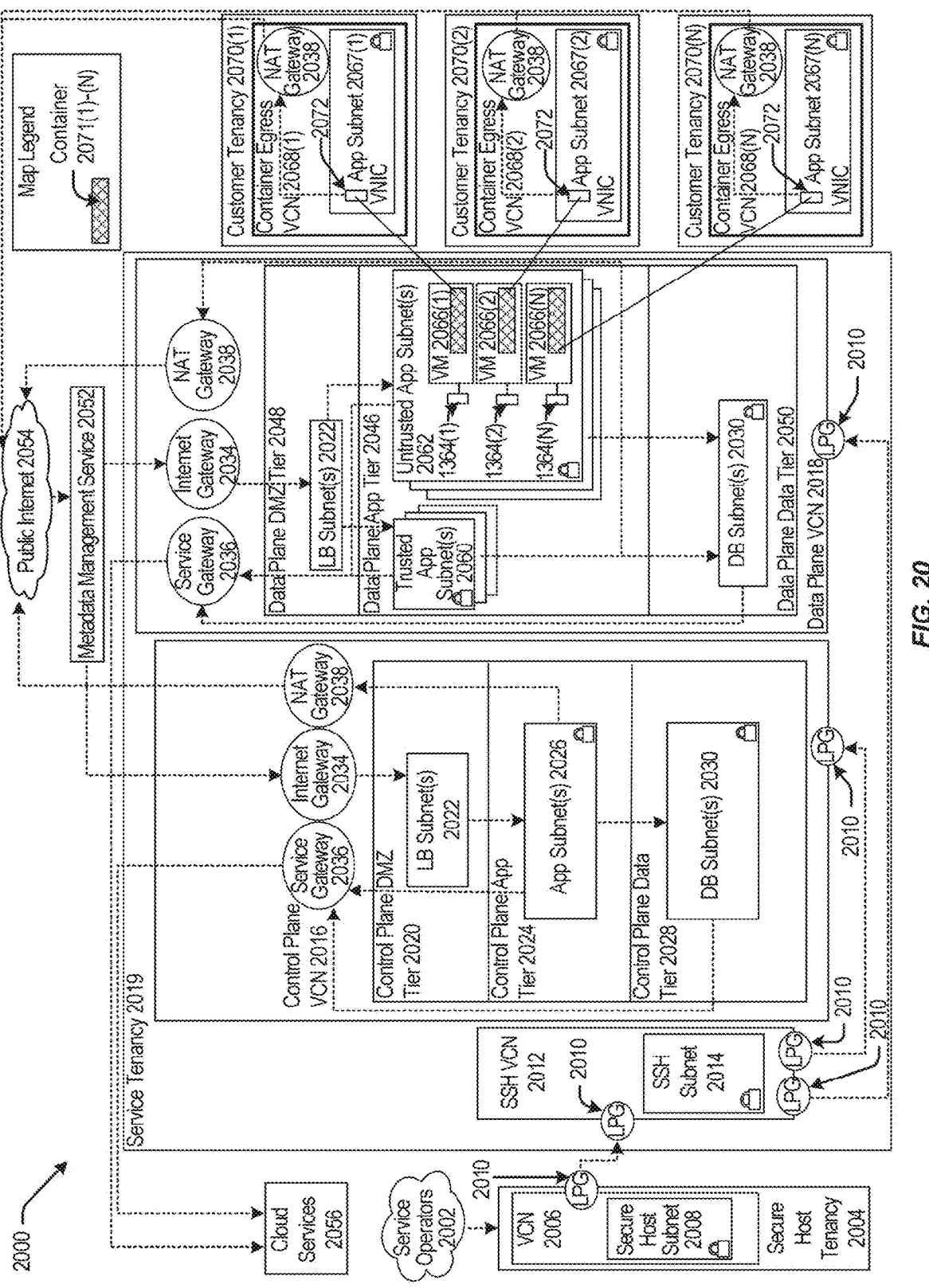
FIG. 20 is a block diagram illustrating another pattern for implementing a cloud infrastructure as a service system, according to at least one embodiment.

FIG. 20 is a block diagram 2000 illustrating another example pattern of an IaaS architecture, according to at least one embodiment. Service operators 2002 (e.g. service operators 1802 of FIG. 18) can be communicatively coupled to a secure host tenancy 2004 (e.g. the secure host tenancy 1804 of FIG. 18) that can include a virtual cloud network (VCN) 2006 (e.g. the VCN 1806 of FIG. 18) and a secure host subnet 2008 (e.g. the secure host subnet 1808 of FIG. 18). The VCN 2006 can include an LPG 2010 (e.g. the LPG 1810 of FIG. 18) that can be communicatively coupled to an SSH VCN 2012 (e.g. the SSH VCN 1812 of FIG. 18) via an LPG 2010 contained in the SSH VCN 2012. The SSH VCN 2012 can include an SSH subnet 2014 (e.g. the SSH subnet 1814 of FIG. 18), and the SSH VCN 1812 can be communicatively coupled to a control plane VCN 2016 (e.g. the control plane VCN 1816 of FIG. 18) via an LPG 2010 contained in the control plane VCN 2016 and to a data plane VCN 2018 (e.g. the data plane 1818 of FIG. 18) via an LPG 2010 contained in the data plane VCN 2018. The control plane VCN 2016 and the data plane VCN 2018 can be contained in a service tenancy 2019 (e.g. the service tenancy 1819 of FIG. 18).

The control plane VCN 1816 can include a control plane DMZ tier 1820 (e.g. the control plane DMZ tier 1820 of FIG. 18) that can include load balancer (LB) subnet(s) 1822 (e.g. LB subnet(s) 1822 of FIG. 18), a control plane app tier 2024 (e.g. the control plane app tier 1824 of FIG. 18) that can include app subnet(s) 2026 (e.g. similar to app subnet(s) 1826 of FIG. 18), a control plane data tier 2028 (e.g. the control plane data tier 1828 of FIG. 18) that can include DB subnet(s) 2030. The LB subnet(s) 2022 contained in the control plane DMZ tier 2020 can be communicatively coupled to the app subnet(s) 2026 contained in the control plane app tier 2024 and to an Internet gateway 1834 (e.g. the Internet gateway 1834 of FIG. 18) that can be contained in the control plane VCN 2016, and the app subnet(s) 2026 can be communicatively coupled to the DB subnet(s) 1830 contained in the control plane data tier 1828 and to a service gateway 1836 (e.g. the service gateway of FIG. 18) and a network address translation (NAT) gateway 1838 (e.g. the NAT gateway 1838 of FIG. 18). The control plane VCN 2016 can include the service gateway 2036 and the NAT gateway 2038.

The data plane VCN 2018 can include a data plane app tier 2046 (e.g. the data plane app tier 1846 of FIG. 18), a data plane DMZ tier 2048 (e.g. the data plane DMZ tier 1848 of FIG. 18), and a data plane data tier 2050 (e.g. the data plane data tier 1850 of FIG. 18). The data plane DMZ tier 2048 can include LB subnet(s) 2022 that can be communicatively coupled to trusted app subnet(s) 2060 and untrusted app subnet(s) 2062 of the data plane app tier 2046 and the Internet gateway 2034 contained in the data plane VCN 2018. The trusted app subnet(s) 2060 can be communicatively coupled to the service gateway 2036 contained in the data plane VCN 2018, the NAT gateway 2038 contained in the data plane VCN 2018, and DB subnet(s) 2030 contained in the data plane data tier 2050. The untrusted app subnet(s)

2062 can be communicatively coupled to the service gateway 2036 contained in the data plane VCN 2018 and DB subnet(s) 2030 contained in the data plane data tier 2050. The data plane data tier 2050 can include DB subnet(s) 2030 that can be communicatively coupled to the service gateway 2036 contained in the data plane VCN 2018.

The untrusted app subnet(s) 2062 can include one or more primary VNICs 2064(1)-(N) that can be communicatively coupled to tenant virtual machines (VMs) 2066(1)-(N). Each tenant VM 2066(1)-(N) can be communicatively coupled to a respective app subnet 2067(1)-(N) that can be contained in respective container egress VCNs 2068(1)-(N) that can be contained in respective customer tenancies 2070(1)-(N). Respective secondary VNICs 2072(1)-(N) can facilitate communication between the untrusted app subnet(s) 2062 contained in the data plane VCN 2018 and the app subnet contained in the container egress VCNs 2068(1)-(N). Each container egress VCNs 2068(1)-(N) can include a NAT gateway 2038 that can be communicatively coupled to public Internet 2054 (e.g. public Internet 1854 of FIG. 18).

The Internet gateway 2034 contained in the control plane VCN 2016 and contained in the data plane VCN 2018 can be communicatively coupled to a metadata management service 2052 (e.g. the metadata management system 1852 of FIG. 18) that can be communicatively coupled to public Internet 2054. Public Internet 2054 can be communicatively coupled to the NAT gateway 2038 contained in the control plane VCN 2016 and contained in the data plane VCN 2018. The service gateway 2036 contained in the control plane VCN 2016 and contained in the data plane VCN 2018 can be communicatively couple to cloud services 2056.

In some embodiments, the data plane VCN 2018 can be integrated with customer tenancies 2070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 2046. Code to run the function may be executed in the VMs 2066(1)-(N), and the code may not be configured to run anywhere else on the data plane VCN 2018. Each VM 2066(1)-(N) may be connected to one customer tenancy 2070. Respective containers 2071(1)-(N) contained in the VMs 2066(1)-(N) may be configured to run the code. In this case, there can be a dual isolation (e.g., the containers 2071(1)-(N) running code, where the containers 2071(1)-(N) may be contained in at least the VM 2066(1)-(N) that are contained in the untrusted app subnet(s) 2062), which may help prevent incorrect or otherwise undesirable code from damaging the network of the IaaS provider or from damaging a network of a different customer. The containers 2071(1)-(N) may be communicatively coupled to the customer tenancy 2070 and may be configured to transmit or receive data from the customer tenancy 2070. The containers 2071(1)-(N) may not be configured to transmit or receive data from any other entity in the data plane VCN 2018. Upon completion of running the code, the IaaS provider may kill or otherwise dispose of the containers 2071(1)-(N).

In some embodiments, the trusted app subnet(s) 2060 may run code that may be owned or operated by the IaaS provider. In this embodiment, the trusted app subnet(s) 2060 may be communicatively coupled to the DB subnet(s) 2030 and be configured to execute CRUD operations in the DB subnet(s) 2030. The untrusted app subnet(s) 2062 may be communicatively coupled to the DB subnet(s) 2030, but in this embodiment, the untrusted app subnet(s) may be configured to execute read operations in the DB subnet(s) 2030. The containers 2071(1)-(N) that can be contained in the VM 2066(1)-(N) of each customer and that may run code from the customer may not be communicatively coupled with the DB subnet(s) 2030.

In other embodiments, the control plane VCN 2016 and the data plane VCN 2018 may not be directly communicatively coupled. In this embodiment, there may be no direct communication between the control plane VCN 2016 and the data plane VCN 2018. However, communication can occur indirectly through at least one method. An LPG 2010 may be established by the IaaS provider that can facilitate communication between the control plane VCN 2016 and the data plane VCN 2018. In another example, the control plane VCN 2016 or the data plane VCN 2018 can make a call to cloud services 2056 via the service gateway 2036. For example, a call to cloud services 2056 from the control plane VCN 2016 can include a request for a service that can communicate with the data plane VCN 2018.

Figure 21:
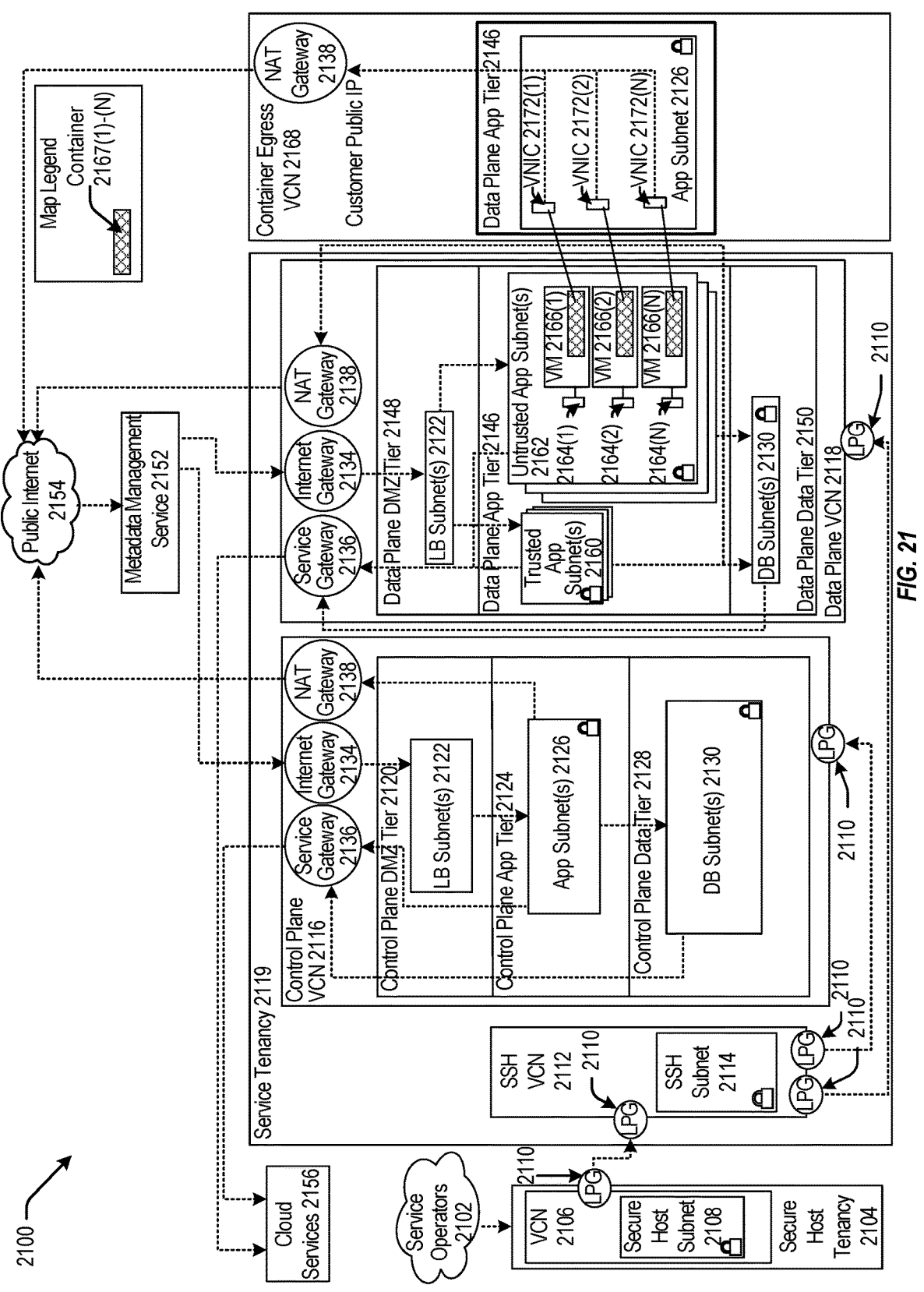
FIG. 21 is a block diagram illustrating another pattern for implementing a cloud infrastructure as a service system, according to at least one embodiment.

FIG. 21 is a block diagram 2100 illustrating another example pattern of an IaaS architecture, according to at least one embodiment. Service operators 2102 (e.g. service operators 1802 of FIG. 18) can be communicatively coupled to a secure host tenancy 2104 (e.g. the secure host tenancy 1804 of FIG. 18) that can include a virtual cloud network (VCN) 2106 (e.g. the VCN 1806 of FIG. 18) and a secure host subnet 2108 (e.g. the secure host subnet 1808 of FIG. 18). The VCN 2106 can include an LPG 2110 (e.g. the LPG 1810 of FIG. 18) that can be communicatively coupled to an SSH VCN 2112 (e.g. the SSH VCN 1812 of FIG. 18) via an LPG 2110 contained in the SSH VCN 2112. The SSH VCN 2112 can include an SSH subnet 2114 (e.g. the SSH subnet 1814 of FIG. 18), and the SSH VCN 2112 can be communicatively coupled to a control plane VCN 2116 (e.g. the control plane VCN 1816 of FIG. 18) via an LPG 2110 contained in the control plane VCN 2116 and to a data plane VCN 2118 (e.g. the data plane 1818 of FIG. 18) via an LPG 2110 contained in the data plane VCN 2118. The control plane VCN 2116 and the data plane VCN 2118 can be contained in a service tenancy 2119 (e.g. the service tenancy 1819 of FIG. 18).

The control plane VCN 2116 can include a control plane DMZ tier 2120 (e.g. the control plane DMZ tier 1820 of FIG. 18) that can include LB subnet(s) 2122 (e.g. LB subnet(s) 1822 of FIG. 18), a control plane app tier 2124 (e.g. the control plane app tier 1824 of FIG. 18) that can include app subnet(s) 2126 (e.g. app subnet(s) 1826 of FIG. 18), a control plane data tier 2128 (e.g. the control plane data tier 1828 of FIG. 18) that can include DB subnet(s) 2130 (e.g. DB subnet(s) 2030 of FIG. 20). The LB subnet(s) 2122 contained in the control plane DMZ tier 2120 can be communicatively coupled to the app subnet(s) 2126 contained in the control plane app tier 2124 and to an Internet gateway 2134 (e.g. the Internet gateway 1834 of FIG. 18) that can be contained in the control plane VCN 2116, and the app subnet(s) 2126 can be communicatively coupled to the DB subnet(s) 2130 contained in the control plane data tier 2128 and to a service gateway 2136 (e.g. the service gateway of FIG. 18) and a network address translation (NAT) gateway 2138 (e.g. the NAT gateway 1838 of FIG. 18). The control plane VCN 2116 can include the service gateway 2136 and the NAT gateway 2138.

The data plane VCN 2118 can include a data plane app tier 2146 (e.g. the data plane app tier 1846 of FIG. 18), a data plane DMZ tier 2148 (e.g. the data plane DMZ tier 2148 of FIG. 18), and a data plane data tier 2150 (e.g. the data plane data tier 1850 of FIG. 18). The data plane DMZ tier 2148 can include LB subnet(s) 2122 that can be communicatively coupled to trusted app subnet(s) 2160 (e.g. trusted app subnet(s) 2060 of FIG. 20) and untrusted app subnet(s) 2162 (e.g. untrusted app subnet(s) 2062 of FIG. 20) of the data plane app tier 2146 and the Internet gateway 2134 contained in the data plane VCN 2118. The trusted app subnet(s) 2160 can be communicatively coupled to the service gateway 2136 contained in the data plane VCN 2118, the NAT gateway 2138 contained in the data plane VCN 2118, and DB subnet(s) 2130 contained in the data plane data tier 2150. The untrusted app subnet(s) 2162 can be communicatively coupled to the service gateway 2136 contained in the data plane VCN 2118 and DB subnet(s) 2130 contained in the data plane data tier 2150. The data plane data tier 2150 can include DB subnet(s) 2130 that can be communicatively coupled to the service gateway 2136 contained in the data plane VCN 2118.

The untrusted app subnet(s) 2162 can include primary VNICs 2164(1)-(N) that can be communicatively coupled to tenant virtual machines (VMs) 2166(1)-(N) residing within the untrusted app subnet(s) 2162. Each tenant VM 2166(1)-(N) can run code in a respective container 2167(1)-(N), and be communicatively coupled to an app subnet 2126 that can be contained in a data plane app tier 2146 that can be contained in a container egress VCN 2168. Respective secondary VNICs 2172(1)-(N) can facilitate communication between the untrusted app subnet(s) 2162 contained in the data plane VCN 2118 and the app subnet contained in the container egress VCN 2168. The container egress VCN can include a NAT gateway 2138 that can be communicatively coupled to public Internet 2154 (e.g. public Internet 1854 of FIG. 18).

The Internet gateway 2134 contained in the control plane VCN 2116 and contained in the data plane VCN 2118 can be communicatively coupled to a metadata management service 2152 (e.g. the metadata management system 1852 of FIG. 18) that can be communicatively coupled to public Internet 2154. Public Internet 2154 can be communicatively coupled to the NAT gateway 2138 contained in the control plane VCN 2116 and contained in the data plane VCN 2118. The service gateway 2136 contained in the control plane VCN 2116 and contained in the data plane VCN 2118 can be communicatively couple to cloud services 2156.

In some examples, the pattern illustrated by the architecture of block diagram 2100 of FIG. 21 may be considered an exception to the pattern illustrated by the architecture of block diagram 2000 of FIG. 20 and may be desirable for a customer of the IaaS provider if the IaaS provider cannot directly communicate with the customer (e.g., a disconnected region). The respective containers 2167(1)-(N) that are contained in the VMs 2166(1)-(N) for each customer can be accessed in real-time by the customer. The containers 2167(1)-(N) may be configured to make calls to respective secondary VNICs 2172(1)-(N) contained in app subnet(s) 2126 of the data plane app tier 2146 that can be contained in the container egress VCN 2168. The secondary VNICs 2172(1)-(N) can transmit the calls to the NAT gateway 2138 that may transmit the calls to public Internet 2154. In this example, the containers 2167(1)-(N) that can be accessed in real-time by the customer can be isolated from the control plane VCN 2116 and can be isolated from other entities contained in the data plane VCN 2118. The containers 2167(1)-(N) may also be isolated from resources from other customers.

In other examples, the customer can use the containers 2167(1)-(N) to call cloud services 2156. In this example, the customer may run code in the containers 2167(1)-(N) that requests a service from cloud services 2156. The containers 2167(1)-(N) can transmit this request to the secondary VNICs 2172(1)-(N) that can transmit the request to the NAT gateway that can transmit the request to public Internet 2154. Public Internet 2154 can transmit the request to LB subnet(s) 2122 contained in the control plane VCN 2116 via the Internet gateway 2134. In response to determining the request is valid, the LB subnet(s) can transmit the request to app subnet(s) 2126 that can transmit the request to cloud services 2156 via the service gateway 2136.

It should be appreciated that IaaS architectures 1800, 1900, 2000, 2100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 22:
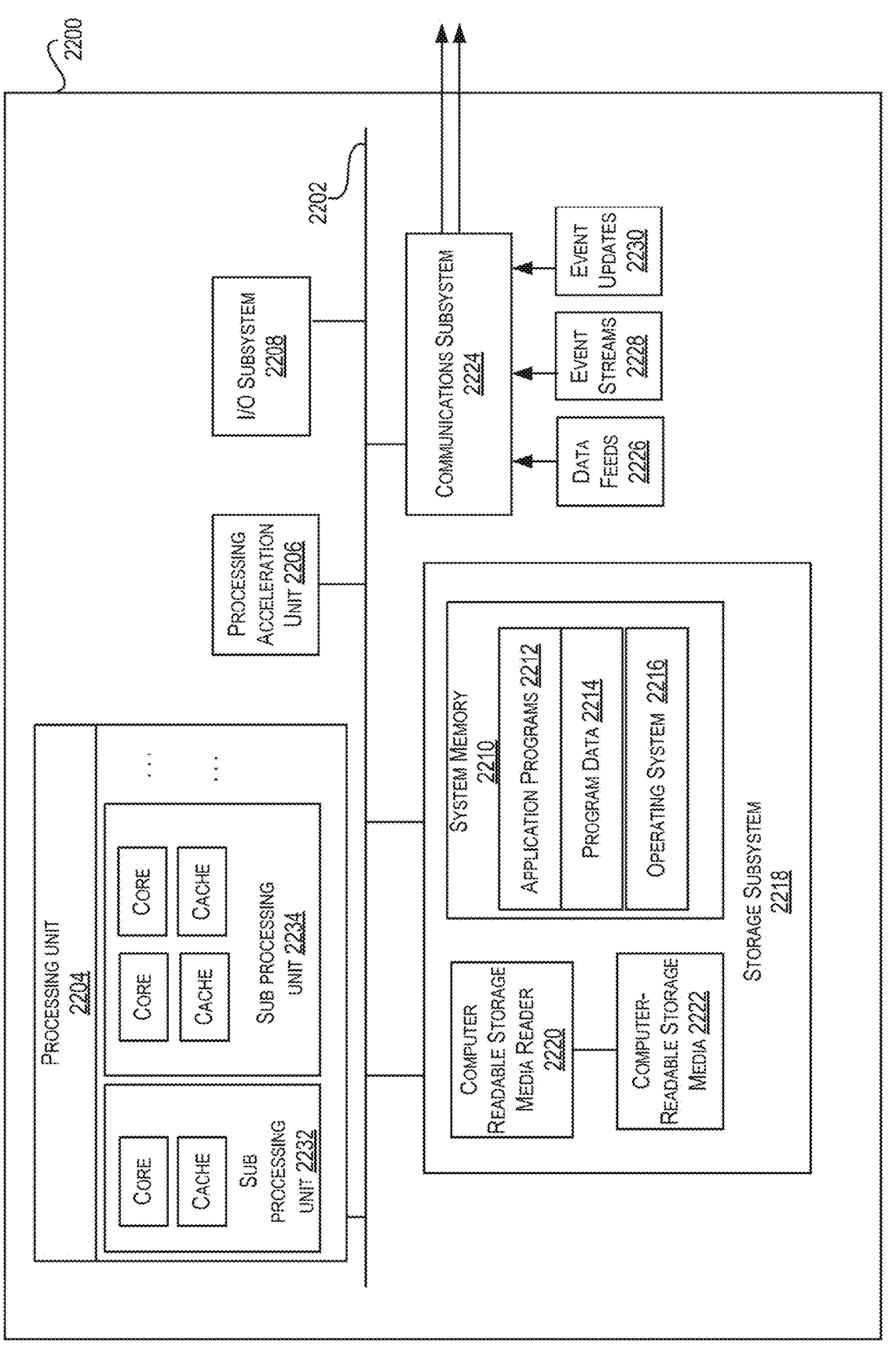
FIG. 22 is a block diagram illustrating an example computer system, according to at least one embodiment.

FIG. 22 illustrates an example computer system 2200, in which various embodiments of the present disclosure may be implemented. The system 2200 may be used to implement any of the computer systems described above. As shown in the figure, computer system 2200 includes a processing unit 2204 that communicates with a number of peripheral subsystems via a bus subsystem 2202. These peripheral subsystems may include a processing acceleration unit 2206, an I/O subsystem 2208, a storage subsystem 2218 and a communications subsystem 2224. Storage subsystem 2218 includes tangible computer-readable storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative embodiments of the bus subsystem may utilize multiple buses. Bus subsystem 2202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2204, which can be implemented as one or more integrated circuits (e.g., a conventional microprocessor or microcontroller), controls the operation of computer system 2200. One or more processors may be included in processing unit 2204. These processors may include single core or multicore processors. In certain embodiments, processing unit 2204 may be implemented as one or more independent processing units 2232 and/or 2234 with single or multicore processors included in each processing unit. In other embodiments, processing unit 2204 may also be implemented as a quad-core processing unit formed by integrating two dual-core processors into a single chip.

In various embodiments, processing unit 2204 can execute a variety of programs in response to program code and can maintain multiple concurrently executing programs or processes. At any given time, some or all of the program code to be executed can be resident in processor(s) 2204 and/or in storage subsystem 2218. Through suitable programming, processor(s) 2204 can provide various functionalities described above. Computer system 2200 may additionally include a processing acceleration unit 2206, which can include a digital signal processor (DSP), a special-purpose processor, and/or the like.

I/O subsystem 2208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2200 may comprise a storage subsystem 2218 that comprises software elements, shown as being currently located within a system memory 2210. System memory 2210 may store program instructions that are loadable and executable on processing unit 2204, as well as data generated during the execution of these programs.

Depending on the configuration and type of computer system 2200, system memory 2210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2204. In some implementations, system memory 2210 may include multiple different types of memory, such as static random access memory (SRAM) or dynamic random access memory (DRAM). In some implementations, a basic input/output system (BIOS), containing the basic routines that help to transfer information between elements within computer system 2200, such as during start-up, may typically be stored in the ROM. By way of example, and not limitation, system memory 2210 also illustrates application programs 2212, which may include client applications, Web browsers, mid-tier applications, relational database management systems (RDBMS), etc., program data 2214, and an operating system 2216. By way of example, operating system 2216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 17 OS, and Palm® OS operating systems.

Storage subsystem 2218 may also provide a tangible computer-readable storage medium for storing the basic programming and data constructs that provide the functionality of some embodiments. Software (programs, code modules, instructions) that when executed by a processor provide the functionality described above may be stored in storage subsystem 2218. These software modules or instructions may be executed by processing unit 2204. Storage subsystem 2218 may also provide a repository for storing data used in accordance with the present disclosure.

Storage subsystem 2200 may also include a computer-readable storage media reader 2220 that can further be connected to computer-readable storage media 2222. Together and, optionally, in combination with system memory 2210, computer-readable storage media 2222 may comprehensively represent remote, local, fixed, and/or removable storage devices plus storage media for temporarily and/or more permanently containing, storing, transmitting, and retrieving computer-readable information.

Computer-readable storage media 2222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2200.

By way of example, computer-readable storage media 2222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2200.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to connect to one or more devices via the Internet. In some embodiments communications subsystem 2224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2224 can provide wired network connectivity (e.g., Ethernet) in addition to or instead of a wireless interface.

In some embodiments, communications subsystem 2224 may also receive input communication in the form of structured and/or unstructured data feeds 2226, event streams 2228, event updates 2230, and the like on behalf of one or more users who may use computer system 2200.

By way of example, communications subsystem 2224 may be configured to receive data feeds 2226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2224 may also be configured to receive data in the form of continuous data streams, which may include event streams 2228 of real-time events and/or event updates 2230 that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2224 may also be configured to output the structured and/or unstructured data feeds 2226, event streams 2228, event updates 2230, and the like to one or more databases that may be in communication with one or more streaming data source computers coupled to computer system 2200.

Computer system 2200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein. In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A method comprising:

receiving, by a first network virtualization device (NVD) of a physical network, a first portion of first state information of a first virtual network interface card (VNIC) of a set of VNICs, wherein the first VNIC is hosted by a second NVD, wherein the first VNIC performs forwarding of packets for a set of one or more packet flows from a compute instance hosted on a physical host machine connectively coupled to the second NVD, wherein the first NVD is a backup for the first VNIC, wherein:

the physical network hosts a virtual network, the physical network comprising the physical host machine, the first NVD, and the second NVD, and wherein the first NVD and the second NVD are different physical devices with separate processors from network interface cards of the physical host machine, and the virtual network comprises one or more compute instances including the compute instance, and the set of VNICs;

storing, by the first NVD, the first portion of the first state information for the first VNIC;

receiving, by the first NVD, availability information indicating that the second NVD is unavailable;

receiving, by the first NVD, packets associated with the set of one or more packet flows; and forwarding, by the first NVD, the packets based on the first portion of the first state information.

2. The method of claim 1, further comprising:

receiving, by the first NVD, updated state information associated with at least one packet flow of the set of one or more packet flows; and storing, by the first NVD, the updated state information for the first VNIC.

3. The method of claim 1, wherein the availability information is received at a first time, and wherein the method further comprises:

receiving, by the first NVD at a second time after the first time, second availability information indicating that the second NVD is available; and determining, by the first NVD after the second time, to not forward the packets.

4. The method of claim 1, further comprising:

identifying, by the first NVD, a packet flow for the packets based on information within one or more fields in a header of at least one packet of the packets.

5. The method of claim 4, wherein the one or more fields includes a source address field, a destination address field, a source port field, a destination port field, and a protocol field.

6. The method of claim 1, wherein the availability information is received at a first time, and wherein the method further comprises:

receiving, by the first NVD from the second NVD at a second time after the first time, a request for the first portion of the first state information for the first VNIC; and transmitting, by the first NVD to the second NVD, the first portion of the first state information for the first VNIC.

7. The method of claim 1, further comprising:

receiving, by the first NVD, a second portion of second state information of a second VNIC, wherein the second VNIC is hosted by a third NVD of the physical network, wherein the second VNIC performs forwarding of packets for a second set of one or more packet flows from a second compute instance of the virtual network, wherein the second VNIC is hosted on a second physical host machine connectively coupled to the third NVD, wherein the third NVD is a different physical device from the first NVD and the second NVD with separate processors from network interface cards of the physical host machine, and wherein the first NVD is a backup for the second VNIC;

storing, by the first NVD, the second portion of the second state information for the second VNIC;

receiving, by the first NVD, second availability information indicating that the third NVD is unavailable;

receiving, by the first NVD, second packets associated with the second set of one or more packet flows; and forwarding, by the first NVD, the second packets based on the second portion of the second state information.

8. The method of claim 1, further comprising:

determining, by the first NVD, that a particular period of time has elapsed; and in response to determining the particular period of time has elapsed, transmitting, by the first NVD to the second NVD, a signal requesting the second NVD to send, to the first NVD, the first portion of the first state information for the first VNIC.

9. The method of claim 1, further comprising transmitting, by the first NVD to the second NVD, a signal requesting the second NVD to send, to the first NVD, the first portion of the first state information for the first VNIC.

10. The method of claim 1, further comprising transmitting, by the first NVD to the second NVD, a signal requesting the second NVD to send, to the first NVD, the first portion of the first state information for each VNIC hosted by the second NVD for which the first NVD is identified as a backup.

11. The method of claim 1, wherein the second NVD is associated with a plurality of VNICs including the first VNIC, and wherein the first NVD is a backup for the plurality of VNICs.

12. A computer system, comprising:

one or more processors and a non-transitory computer-readable storage medium of a first network virtualization device (NVD) of a physical network, the non-transitory computer-readable storage medium containing instructions which, when executed on the one or more processors, cause the one or more processors to perform operations including:

receiving a first portion of first state information of a first virtual network interface card (VNIC) of a set of VNICs, wherein the first VNIC is hosted by a second NVD, wherein the first VNIC performs forwarding of packets for a set of one or more packet flows from a compute instance hosted on a physical host machine connectively coupled to the second NVD, wherein the first NVD is a backup for the first VNIC, wherein:

the physical network hosts a virtual network, the physical network comprising the physical host machine, the first NVD, and the second NVD, and wherein the first NVD and the second NVD are different physical devices with separate processors from network interface cards of the physical host machine, and the virtual network comprises one or more compute instances including the compute instance, and the set of VNICs;

storing the first portion of the first state information for the first VNIC;

receiving availability information indicating that the second NVD is unavailable;

receiving packets associated with the set of one or more packet flows; and forwarding the packets based on the first portion of the first state information.

13. The computer system of claim 12, wherein the availability information is received at a first time, and wherein the non-transitory computer-readable storage medium contains further instructions which, when executed on the one or more processors, cause the one or more processors to perform further operations including:

receiving, at a second time after the first time, second availability information indicating that the second NVD is available; and determining, after the second time, to not forward the packets.

14. The computer system of claim 12, wherein the availability information is received at a first time, and wherein the non-transitory computer-readable storage medium contains further instructions which, when executed on the one or more processors, cause the one or more processors to perform further operations including:

receiving, from the second NVD at a second time after the first time, a request for the first portion of the first state information for the first VNIC; and transmitting, to the second NVD, the first portion of the first state information for the first VNIC.

15. The computer system of claim 12, wherein the non-transitory computer-readable storage medium contains further instructions which, when executed on the one or more processors, cause the one or more processors to perform further operations including:

receiving a second portion of second state information of a second VNIC, wherein the second VNIC is hosted by a third NVD of the physical network, wherein the second VNIC performs forwarding of packets for a second set of one or more packet flows from a second compute instance of the virtual network, wherein the second VNIC is hosted on a second physical host machine connectively coupled to the third NVD, wherein the third NVD is a different physical device from the first NVD and the second NVD with separate processors from network interface cards of the physical host machine, and wherein the first NVD is a backup for the second VNIC;

storing the second portion of the second state information for the second VNIC;

receiving second availability information indicating that the third NVD is unavailable;

receiving second packets associated with the second set of one or more packet flows; and forwarding the second packets based on the second portion of the second state information.

16. The computer system of claim 12, further comprising:

determining, by the first NVD, that a particular period of time has elapsed; and in response to determining the particular period of time has elapsed, transmitting, by the first NVD to the second NVD, a signal requesting the second NVD to send, to the first NVD, the first portion of the first state information for the first VNIC.

17. One or more non-transitory computer-readable media storing instructions that, upon execution on a first network virtualization device (NVD) of a physical network, cause the first NVD to perform operations comprising:

receiving a first portion of first state information of a first virtual network interface card (VNIC) of a set of VNICs, wherein the first VNIC is hosted by a second NVD, wherein the first VNIC performs forwarding of packets for a set of one or more packet flows from a compute instance hosted on a physical host machine connectively coupled to the second NVD, wherein the first NVD is a backup for the first VNIC, wherein:

the physical network hosts a virtual network, the physical network comprising the physical host machine, the first NVD, and the second NVD, and wherein the first NVD and the second NVD are different physical devices with separate processors from network interface cards of the physical host machine, and the virtual network comprises one or more compute instances including the compute instance, and the set of VNICs;

storing the first portion of the first state information for the first VNIC;

receiving availability information indicating that the second NVD is unavailable;

receiving packets associated with the set of one or more packet flows; and forwarding the packets based on the first portion of the first state information.

18. The one or more non-transitory computer-readable media of claim 17, wherein the availability information is received at a first time, and wherein the one or more non-transitory computer-readable media storing instructions that, upon execution on the first NVD, cause the first NVD to perform operations further comprising:

receiving, at a second time after the first time, second availability information indicating that the second NVD is available; and determining, after the second time, to not forward the packets.

19. The one or more non-transitory computer-readable media of claim 17, wherein the availability information is received at a first time, and wherein the one or more non-transitory computer-readable media storing instructions that, upon execution on the first NVD, cause the first NVD to perform operations further comprising:

receiving, from the second NVD at a second time after the first time, a request for the first portion of the first state information for the first VNIC; and transmitting, to the second NVD, the first portion of the first state information for the first VNIC.

20. The one or more non-transitory computer-readable media of claim 17, wherein the one or more non-transitory computer-readable media storing instructions that, upon execution on the first NVD, cause the first NVD to perform operations further comprising:

receiving a second portion of second state information of a second VNIC, wherein the second VNIC is hosted by a third NVD of the physical network, wherein the second VNIC performs forwarding of packets for a second set of one or more packet flows from a second compute instance of the virtual network, wherein the second VNIC is hosted on a second physical host machine connectively coupled to the third NVD, wherein the third NVD is a different physical device from the first NVD and the second NVD with separate processors from network interface cards of the physical host machine, and wherein the first NVD is a backup for the second VNIC;

storing the second portion of the second state information for the second VNIC;

receiving second availability information indicating that the third NVD is unavailable;

receiving second packets associated with the second set of one or more packet flows; and forwarding the second packets based on the second portion of the second state information.

\*     \*     \*     \*     \*